United States Patent
Kani et al.

(10) Patent No.: US 9,334,164 B2
(45) Date of Patent: May 10, 2016

(54) HYDROGEN GENERATOR AND FUEL CELL SYSTEM

(75) Inventors: Yukimune Kani, Osaka (JP); Hidenobu Wakita, Kyoto (JP); Seiji Fujihara, Osaka (JP); Tomoyuki Nakajima, Hyogo (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 1246 days.

(21) Appl. No.: 13/264,128

(22) PCT Filed: Dec. 24, 2010

(86) PCT No.: PCT/JP2010/007521
§ 371 (c)(1),
(2), (4) Date: Oct. 12, 2011

(87) PCT Pub. No.: WO2011/077753
PCT Pub. Date: Jun. 30, 2011

(65) Prior Publication Data
US 2012/0040256 A1 Feb. 16, 2012

(30) Foreign Application Priority Data

Dec. 25, 2009 (JP) ................................. 2009-294155
Feb. 25, 2010 (JP) ................................. 2010-039700

(51) Int. Cl.
*C01B 3/02* (2006.01)
*C01B 3/08* (2006.01)
(Continued)

(52) U.S. Cl.
CPC ............. *C01B 3/384* (2013.01); *H01M 8/0618* (2013.01); *C01B 2203/0233* (2013.01);
(Continued)

(58) Field of Classification Search
CPC .................. C01B 2203/065; C01B 2203/127; C01B 3/384; C01B 2203/066; C01B 2203/0811; C01B 2203/0822; C01B 2203/0827
See application file for complete search history.

(56) References Cited

U.S. PATENT DOCUMENTS 3,480,417 A * 11/1969 Setzer ............................... 48/94
4,098,960 A * 7/1978 Gagnon ......................... 429/410
(Continued)

FOREIGN PATENT DOCUMENTS

JP 01-275697 11/1989
JP 5-114414 5/1993
(Continued)

OTHER PUBLICATIONS

Chinese Office Action issued in Application No. 201080016672.1 dated Aug. 29, 2014 with English translation.
(Continued)

*Primary Examiner* — Matthew Merkling
(74) *Attorney, Agent, or Firm* — McDermott Will & Emery LLP

(57) ABSTRACT

A hydrogen generator (100) includes: a hydrogen generating unit (1) configured to generate a hydrogen-containing gas by using a raw material gas; a hydro-desulfurizer (7) configured to remove a sulfur compound in the raw material gas supplied to the hydrogen generating unit (1); a first gas channel (5) through which the raw material gas supplied through the hydro-desulfurizer (7) to the hydrogen generating unit (1) flows; a recycle channel (10) through which the hydrogen-containing gas from the hydrogen generating unit (1) is supplied to the raw material gas in the first gas channel (5) located upstream of the hydro-desulfurizer (7); a raw material gas supply unit (6) disposed between the hydro-desulfurizer (7) and a meeting point where the first gas channel (5) and the recycle channel (10) meet; and a first on-off valve (8) disposed between the raw material gas supply unit (6) and the hydro-desulfurizer (7) to close when the hydrogen generator (100) stops.

6 Claims, 13 Drawing Sheets

(51) Int. Cl.
*C01B 3/38* (2006.01)
*H01M 8/06* (2016.01)

(52) U.S. Cl.
CPC .. *C01B 2203/066* (2013.01); *C01B 2203/0811* (2013.01); *C01B 2203/0822* (2013.01); *C01B 2203/0827* (2013.01); *C01B 2203/127* (2013.01); *C01B 2203/1258* (2013.01); *C01B 2203/148* (2013.01); *C01B 2203/16* (2013.01); *C01B 2203/1633* (2013.01); *Y02E 60/50* (2013.01); *Y02P 20/128* (2015.11)

(56) References Cited

U.S. PATENT DOCUMENTS

| | | | | |
|---|---|---|---|---|
| 4,181,503 | A | * | 1/1980 | Lesieur et al. ............... 48/127.7 |
| 4,976,747 | A | | 12/1990 | Szydlowski et al. |
| 5,686,196 | A | | 11/1997 | Singh et al. |
| 7,749,626 | B2 | * | 7/2010 | Take .............................. 429/423 |
| 8,557,452 | B2 | * | 10/2013 | Foley et al. .................. 429/410 |
| 2004/0043262 | A1 | | 3/2004 | Asou et al. |
| 2005/0061371 | A1 | * | 3/2005 | Kimbara ............... F17C 13/025 137/266 |
| 2005/0106428 | A1 | * | 5/2005 | Bolden ........................ 429/19 |
| 2009/0087701 | A1 | | 4/2009 | Kuwaba |
| 2009/0194459 | A1 | * | 8/2009 | Vincitore et al. ............... 208/97 |
| 2011/0003214 | A1 | | 1/2011 | Foley et al. |

FOREIGN PATENT DOCUMENTS

| | | |
|---|---|---|
| JP | 2002-020102 | 1/2002 |
| JP | 2002-020103 | 1/2002 |
| JP | 2002-356308 | 12/2002 |
| JP | 2003-306309 | 10/2003 |
| JP | 2004-228016 | 8/2004 |
| JP | 2005-044653 | 2/2005 |
| JP | 2006-008459 | 1/2006 |
| JP | 4130603 | 5/2008 |
| JP | 4264791 | 2/2009 |
| JP | 2009-078954 A | 4/2009 |
| JP | 2009-249203 | 10/2009 |
| JP | 2009-274886 A | 11/2009 |
| WO | 2008/016361 A1 | 2/2008 |
| WO | 2009/142611 A1 | 11/2009 |

OTHER PUBLICATIONS

Extended European Search Report issued in European Application No. 10838991.7 dated Jan. 27, 2014.

Chinese Office Action issued in Chinese Application No. 201080016672.1 with mailing date Jan. 30, 2014, with English Translation, along with a Search Report.

International Search Report issued in International Patent Application No. PCT/JP2010/007521 dated Mar. 15, 2011.

* cited by examiner

HYDROGEN GENERATOR AND FUEL CELL SYSTEM

RELATED APPLICATIONS

This application is the U.S. National Phase under 35 U.S.C. §371 of International Application No. PCT/JP2010/007521, filed on Dec. 24, 2010, which in turn claims the benefit of Japanese Application Nos. 2009-294155, filed on Dec. 25, 2009, and 2010-039700, filed Feb. 25, 2010, the disclosures of which Applications are incorporated by reference herein.

TECHNICAL FIELD

The present invention relates to a hydrogen generator configured to generate a hydrogen-containing gas from a raw material gas and the like and a fuel cell system configured to generate electric power by utilizing the hydrogen-containing gas generated by the hydrogen generator.

BACKGROUND ART

Fuel cells, which are small devices but realize highly-efficient electric power generation, have been developed as electric power generating systems of distributed energy supply sources. However, means for supplying a hydrogen gas necessary as a fuel for electric power generation is not developed as a general infrastructure. Therefore, a hydrogen generator configured to generate a hydrogen-containing gas by utilizing a raw material gas, such as a city gas or a propane gas, supplied from an existing raw material gas infrastructure and causing a reforming reaction between the raw material gas and water may be attached to the electric power generating system.

The hydrogen generator is typically configured to include: a reformer configured to cause the reforming reaction between the raw material gas and the water; a shift converter configured to cause a water gas shift reaction between carbon monoxide and steam; and a selective oxidizer configured to oxidize the carbon monoxide mainly by an oxidizing agent, such as a small amount of air. In these reactors, catalysts suitable for the respective reactions are used. For example, a Ru catalyst or a Ni catalyst is used in the reformer, a Cu—Zn catalyst is used in the shift converter, and a Ru catalyst or the like is used in the selective oxidizer. Each of the reactors has an appropriate temperature. Typically, the reformer is used at about 600 to 700° C., the shift converter is used at about 200 to 350° C., and the selective oxidizer is used at about 100 to 200° C. Especially, since an electrode of a polymer electrolyte fuel cell tends to be poisoned by CO, the CO concentration of the supplied hydrogen-containing gas needs to be kept to several tens of volume ppm. Therefore, the CO concentration needs to be reduced by oxidizing the CO in the selective oxidizer.

Here, the raw material gas, such as a city gas, contains a sulfur compound. Since the sulfur compound is a poisoning material of especially a reforming catalyst, it has to be removed in some way. Proposed are a hydrogen generator which adopts as a sulfur compound removing method a method for removing the sulfur compound by normal temperature adsorption (see PTL 1, for example) and a hydrogen generator which adopts as the sulfur compound removing method a method for removing the sulfur compound by hydrodesulfurization using the recycled hydrogen-containing gas (see PTL 2, for example). Since the normal temperature adsorption does not require hydrogen, handling thereof is easy, but the adsorption capacity thereof is not large. Since the hydrodesulfurization requires heating and hydrogen, handling thereof is not easy, but the adsorption capacity thereof is large. Here, also proposed is a hydrogen generator which includes and uses both a normal temperature absorbent desulfurizer and a hydro-desulfurizer (see PTLs 2 and 3, for example).

CITATION LIST

Patent Literature

PTL 1: Japanese Laid-Open Patent Application Publication No. 2004-228016
PTL 2: Japanese Laid-Open Patent Application Publication No. 1-275697
PTL 3: Japanese Laid-Open Patent Application Publication No. 2006-8459

SUMMARY OF INVENTION

Technical Problem

However, as in the hydrogen generator described in PTL 2, when the hydrogen-containing gas is added to the raw material gas through a recycle channel, the raw material gas in a raw material gas channel is higher in pressure than the hydrogen-containing gas flowing in the recycle channel. Therefore, in order to stably add the hydrogen-containing gas to the raw material gas through the recycle channel, a pump needs to be additionally disposed on the recycle channel.

In the hydrogen generator described in PTL 3, a raw material gas supply unit is disposed between the hydro-desulfurizer and a meeting point where the recycle channel and the raw material gas supply passage meet. Thus, the raw material gas supply unit serves as both a device for supplying the hydrogen to the raw material gas and a device for supplying the raw material gas to the reformer. However, there is a possibility that hydrogen sulfide remaining in the hydro-desulfurizer diffuses and flows into a raw material gas supply device when the hydrogen generator is in a stop state, and the raw material gas supply device corrodes.

The present invention was made to solve the above conventional problem, and an object of the present invention is to provide a hydrogen generator capable of suppressing more than before the corrosion of the raw material gas supply unit disposed between the hydro-desulfurizer and the meeting point where the recycle channel and the raw material gas supply passage meet, and a fuel cell system including the hydrogen generator.

Solution to Problem

To solve the above conventional problem, a hydrogen generator of the present invention includes: a hydrogen generating unit configured to generate a hydrogen-containing gas by using a raw material gas; a raw material gas supply unit configured to supply the raw material gas to the hydrogen generating unit; a hydro-desulfurizer configured to perform hydrodesulfurization of a sulfur compound in the raw material gas supplied to the hydrogen generating unit; a raw material gas channel through which the raw material gas supplied through the first desulfurizer to the hydrogen generating unit flows; a recycle channel through which the hydrogen-containing gas from the hydrogen generating unit is supplied to the raw material gas in the first gas channel located upstream of the hydro-desulfurizer; the raw material gas supply unit disposed between the hydro-desulfurizer and a meeting point where the raw material gas channel and the recycle channel meet; and an on-off valve disposed between the raw material gas supply unit and the first desulfurizer to close when the hydrogen generator stops.

Thus, an object of the present invention is to provide the hydrogen generator capable of suppressing more than before the corrosion of the raw material gas supply unit provided upstream of the hydro-desulfurizer, and a fuel cell system including the hydrogen generator.

Advantageous Effects of Invention

In accordance with the hydrogen generator and fuel cell system of the present invention, the corrosion of the raw material gas supply unit disposed between the hydro-desulfurizer and the meeting point where the recycle channel and the raw material gas supply passage meet can be suppressed more than before.

DESCRIPTION OF EMBODIMENTS

Hereinafter, embodiments of the present invention will be explained in reference to the drawings.

Embodiment 1

A hydrogen generator of Embodiment 1 includes: a hydrogen generating unit configured to generate a hydrogen-containing gas by using a raw material gas; a hydro-desulfurizer configured to remove a sulfur compound in the raw material gas supplied to the hydrogen generating unit; a first gas channel through which the raw material gas supplied through the hydro-desulfurizer to the hydrogen generating unit flows; a recycle channel through which the hydrogen-containing gas from the hydrogen generating unit is supplied to the raw material gas in the first gas channel located upstream of the hydro-desulfurizer; a raw material gas supply unit disposed between the hydro-desulfurizer and a meeting point where the first gas channel and the recycle channel meet; and a first on-off valve disposed between the raw material gas supply unit and the hydro-desulfurizer to close when the hydrogen generator stops.

In accordance with this configuration, the corrosion of the raw material gas supply unit provided upstream of the hydro-desulfurizer can be suppressed more than before.

Next, details of the hydrogen generator of Embodiment 1 will be explained.

Figure 1:
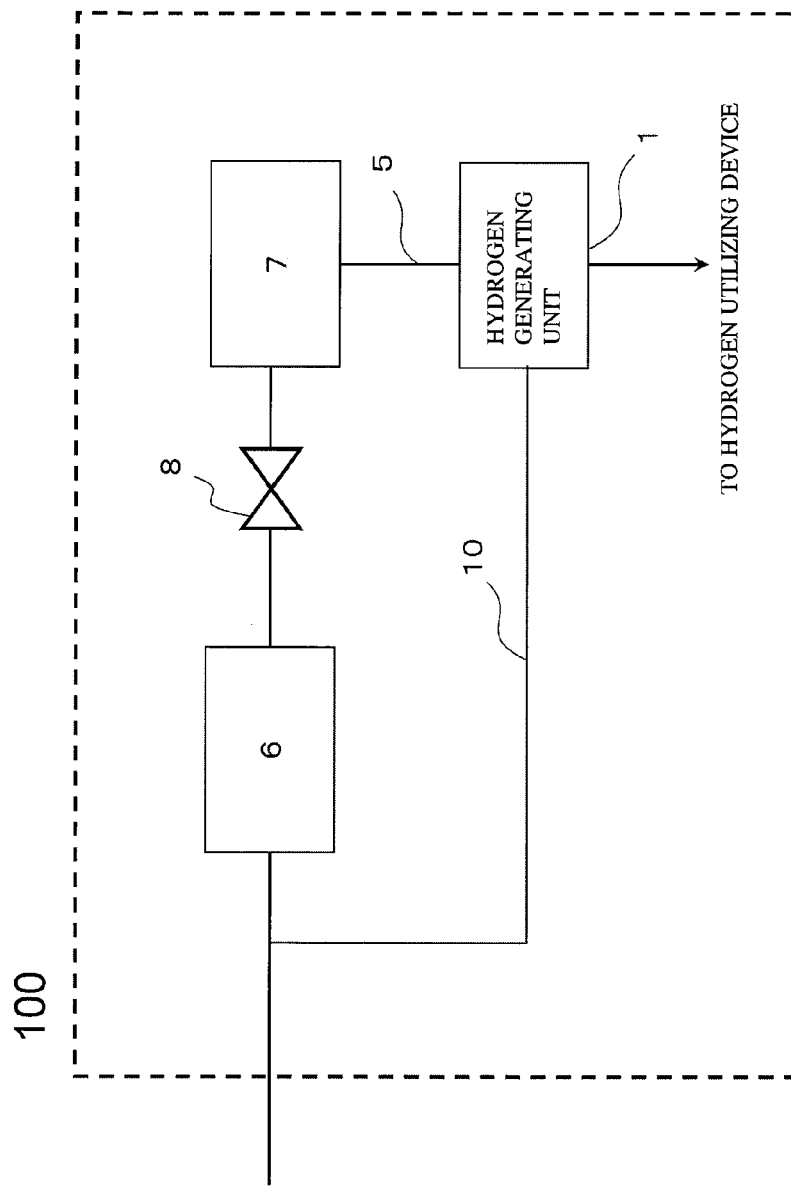
FIG. 1 is a diagram showing one example of the schematic configuration of a hydrogen generator of Embodiment 1.

FIG. 1 is a diagram showing one example of the schematic configuration of the hydrogen generator of Embodiment 1.

As shown in FIG. 1, the hydrogen generator of Embodiment 1 is characterized by including a hydrogen generating unit 1, a raw material gas supply unit 6, a hydro-desulfurizer 7, a first gas channel 5, a recycle channel 10, and a first on-off valve 8.

In accordance with this configuration, the corrosion of the raw material gas supply unit provided upstream of the hydro-desulfurizer can be suppressed more than before.

The hydrogen generating unit 1 generates a hydrogen-containing gas by using a raw material gas. Specifically, a reforming reaction of the raw material gas occurs in a reformer (not shown) in the hydrogen generating unit, and thus, the hydrogen-containing gas is generated.

The reforming reaction may be of any type, and examples thereof are a steam-reforming reaction, an autothermal reaction, and a partial oxidation reaction. Although not shown in FIG. 1, devices necessary for each reforming reaction are suitably provided. For example, if the reforming reaction is the steam-reforming reaction, a combustor configured to heat the reformer, an evaporator configured to generate steam, and a water supply unit configured to supply water to the evaporator are provided. If the reforming reaction is the autothermal reaction, a hydrogen generator 100 is further provided with an air supply unit (not shown) configured to supply air to the reformer. The raw material gas is a gas containing an organic compound constituted by at least carbon and hydrogen. Examples of the raw material gas are a city gas containing methane as a major component, a natural gas, and a LPG The raw material gas supply unit 6 is a device configured to adjust the flow rate of the raw material gas supplied to the hydrogen generating unit. The raw material gas supply unit 6 is constituted by, for example, a booster and a flow rate control valve. However, the raw material gas supply unit 6 may be constituted by one of the booster and the flow rate control valve. The raw material gas is supplied from a raw material gas supply source. The raw material gas source has predetermined supply pressure, and examples thereof are a raw material gas bomb and a raw material gas infrastructure.

The hydro-desulfurizer 7 removes the sulfur compound in the raw material gas supplied to the hydrogen generating unit 1. The hydro-desulfurizer 7 is configured such that a desulfurizing agent for hydrodesulfurization is filled in a container. The desulfurizing agent for the hydrodesulfurization is constituted by, for example, a CoMo-based catalyst for converting the sulfur compound in the raw material gas into hydrogen sulfide, and a ZnO-based catalyst or a CuZn-based catalyst, which is provided downstream of the CoMo-based catalyst and is a sulfur adsorbent for adsorbing and removing the hydrogen sulfide. The desulfurizing agent for the hydrodesulfurization is not limited to the above example and may be constituted only by the CuZn-based catalyst.

The first gas channel 5 is a channel through which the raw material gas supplied through the hydro-desulfurizer 7 to the hydrogen generating unit flows.

The recycle channel 10 is a channel through which the hydrogen-containing gas from the hydrogen generating unit 1 is supplied to the raw material gas in the first gas channel 5 located upstream of the hydro-desulfurizer 7.

The first on-off valve 8 is disposed between the raw material gas supply unit 6 and the hydro-desulfurizer 7 and closes when the hydrogen generator stops. Specifically, when a hydrogen generating operation of the hydrogen generator 100 in which the hydrogen generating unit 1 generates the hydrogen-containing gas stops, a controller (not shown) closes the first on-off valve 8.

The controller stops the operation of the raw material gas supply unit 6 when the hydrogen generating operation of the hydrogen generator 100 stops. When the flow of the raw material gas in the first gas channel 5 stops, there is a possibility that the hydrogen sulfide remaining in the hydro-desulfurizer 7 gradually diffuses and flows into the raw material gas supply unit 6. Such possibility is suppressed by the closed first on-off valve 8. Therefore, the corrosion of the raw material gas supply unit 6 can be suppressed as compared to a conventional hydrogen generator in which the first on-off valve 8 is not provided.

For example, the first on-off valve 8 is closed after the raw material gas supply unit 6 stops. In this case, the first on-off valve 8 may be closed anytime after the stop of the operation of the raw material gas supply unit 6, because the diffusion and inflow of the hydrogen sulfide can be suppressed as compared to the conventional hydrogen generator. The first on-off valve 8 may be closed before or at the same time as the stop of the raw material gas supply unit 6.

The controller controls the operation of the first on-off valve 8. The controller may be any device as long as it has a control function. The controller includes a calculation processing portion (not shown) and a storage portion (not shown) storing a control program. Examples of the calculation processing portion are a MPU and a CPU. One example of the storage portion is a memory. The controller may be constituted by a single controller which performs centralized control or may be constituted by a plurality of controllers which cooperate to perform distributed control.

A valve configured to allow the hydrogen generating unit 1 to communicate with the atmosphere and block the hydrogen generating unit 1 from communicating with the atmosphere may be or may not be disposed on a gas channel through which the hydrogen-containing gas generated by the hydrogen generating unit 1 flows through a hydrogen utilizing device. In a case where the above valve is disposed and the reforming reaction uses the steam (for example, the steam-reforming reaction or the autothermal reaction), there is a possibility that the internal pressure in the hydrogen generating unit 1 increases by the evaporation of water remaining in the hydrogen generating unit 1 or the evaporator, and the hydrogen sulfide remaining in the hydro-desulfurizer 7 flows backward. This is because the valve is closed when the hydrogen generating operation of the hydrogen generator 100 stops, and the remaining water evaporates with the hydrogen generating unit 1 sealed from outside air. In this case, the possibility of the poisoning of the raw material gas supply unit 6 increases. However, by providing the first on-off valve 8, the poisoning can be suppressed as compared to the conventional hydrogen generator.

Embodiment 2

A hydrogen generator of Embodiment 2 includes: a hydrogen generating unit configured to generate a hydrogen-containing gas by using a raw material gas; a hydro-desulfurizer configured to remove a sulfur compound in the raw material gas supplied to the hydrogen generating unit; a first gas channel through which the raw material gas supplied through the hydro-desulfurizer to the hydrogen generating unit flows; a recycle channel through which the hydrogen-containing gas from the hydrogen generating unit is supplied to the raw material gas in the first gas channel located upstream of the hydro-desulfurizer; a raw material gas supply unit disposed between the hydro-desulfurizer and a meeting point where the first gas channel and the recycle channel meet; and a first on-off valve disposed between the raw material gas supply unit and the hydro-desulfurizer to close when the hydrogen generator stops.

In accordance with this configuration, the corrosion of the raw material gas supply unit provided upstream of the hydro-desulfurizer can be suppressed more than before.

A fuel cell system of Embodiment 2 includes any one of the hydrogen generators of Embodiment 2 and a fuel cell configured to generate electric power by using the hydrogen-containing gas supplied from the hydrogen generator.

In accordance with this configuration, the corrosion of the raw material gas supply unit provided upstream of the hydro-desulfurizer can be suppressed more than before.

Other than the above characteristics, the hydrogen generator of Embodiment 2 may be the same in configuration as the hydrogen generator of Embodiment 1.

First, the configuration of the hydrogen generator of Embodiment 2 will be explained.

Figure 2:
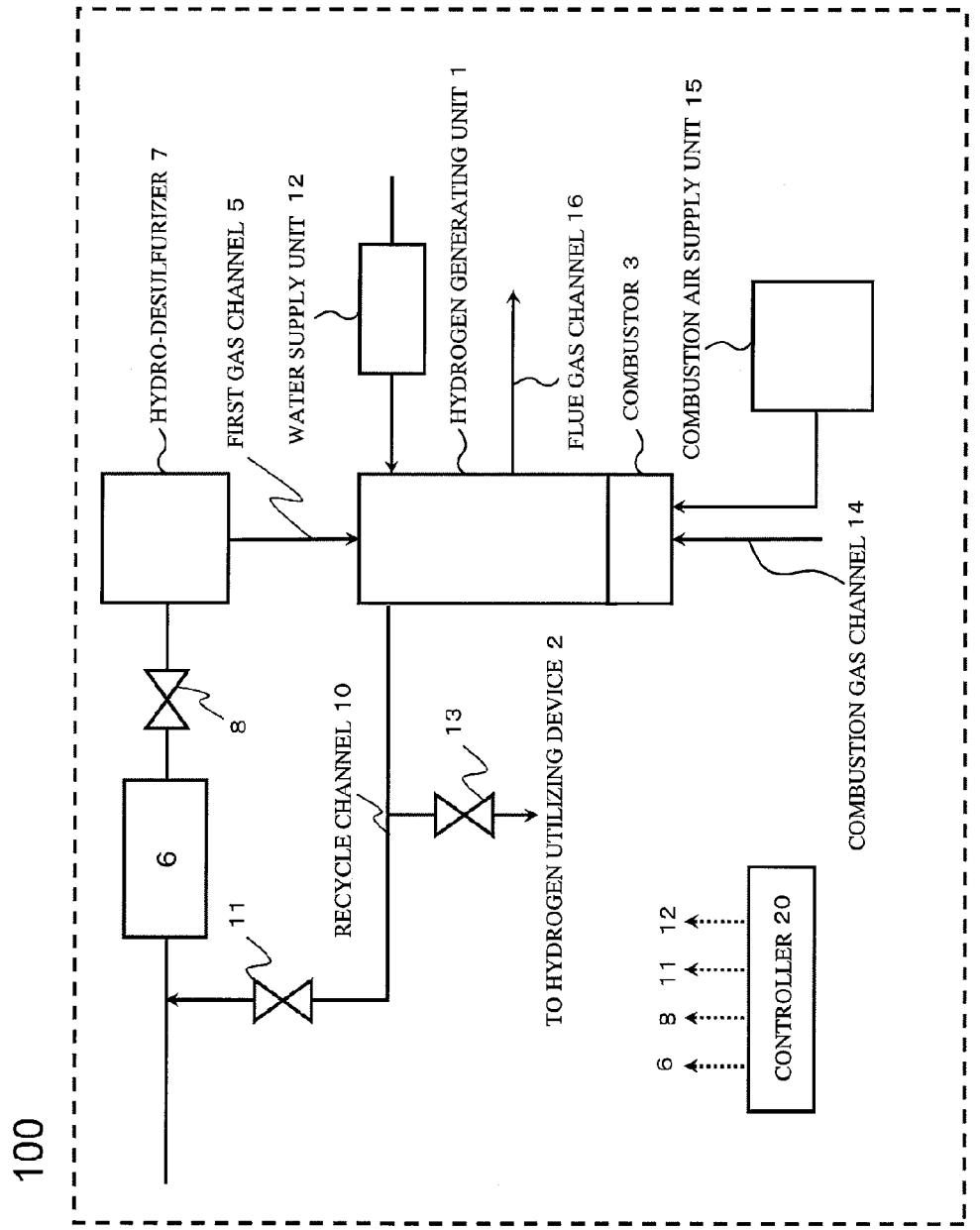
FIG. 2 is a diagram showing one example of the schematic configuration of the hydrogen generator of Embodiment 2.

FIG. 2 is a diagram showing one example of the schematic configuration of the hydrogen generator of Embodiment 2. As shown in FIG. 2, the hydrogen generator 100 of the present embodiment includes: the hydrogen generating unit 1 having the reformer (not shown) configured to generate the hydrogen-containing gas by the reforming reaction using the raw material gas and the steam; the first gas channel 5 through which the raw material gas supplied to the hydrogen generating unit 1 flows; a water supply unit 12 configured to supply water to the hydrogen generating unit 1, the water being used in the reforming reaction; the hydro-desulfurizer 7 disposed on the first gas channel 5 to remove the sulfur compound in the raw material gas by the hydrodesulfurization; the recycle channel 10 through which the hydrogen-containing gas from the hydrogen generating unit 1 is added to the raw material gas supplied to the hydro-desulfurizer 7; the raw material gas supply unit 6 disposed between the hydro-desulfurizer 7 and the meeting point where the recycle channel 10 and the first gas channel 5 meet; and the first on-off valve 8 disposed on the first gas channel 5 extending between the raw material gas supply unit 6 and the hydro-desulfurizer 7. Here, the raw material gas is a gas containing an organic compound constituted by at least carbon and hydrogen. Specific examples are a city gas containing methane as a major component, a natural gas, and a LPG In addition, the hydrogen generator 100 includes: a fifth on-off valve 11 disposed on the recycle channel 10; a sixth on-off valve 13 disposed on a gas channel which communicates with the atmosphere through the hydrogen utilizing device; a combustor 3 configured to heat the reformer; a combustion gas channel 14 configured to supply a combustible combustion gas to the combustor 3; a combustion air supply unit 15 configured to supply combustion air to the combustor 3; a flue gas channel 16 through which a flue gas generated by the combustor 3 configured to heat the reformer flows; and a controller 20 configured to control the operation of the hydrogen generator 100.

Here, the raw material gas supply unit 6 is a device configured to adjust the flow rate of the raw material gas supplied to the reformer. In the present embodiment, the raw material gas supply unit 6 is constituted by the booster and the flow rate control valve but may be constituted by one of the booster and the flow rate control valve. The water supply unit 12 is a device disposed in the hydrogen generating unit 1 to adjust the flow rate of the water supplied to the evaporator (not shown). In the present embodiment, a pump is used as the water supply unit 12.

The hydro-desulfurizer 7 is a device including a hydrodesulfurization catalyst which converts the sulfur compound in the raw material gas into the hydrogen sulfide and adsorbs and removes the hydrogen sulfide. In the present embodiment, used as the hydrodesulfurization catalyst are the CoMo-based catalyst which converts the sulfur compound in the raw material gas into the hydrogen sulfide, and the ZnO-based catalyst or the CuZn-based catalyst, which is provided downstream of the CoMo-based catalyst and is the sulfur adsorbent for adsorbing and removing the hydrogen sulfide. However, the hydrodesulfurization catalyst is not limited to this. It is known that the hydro-desulfurizer 7 shows its desulfurization performance at a comparatively high temperature of about 300° C. In the hydrogen generator 100 of the present embodiment, the hydro-desulfurizer 7 is configured to be able to perform heat exchange with the hydrogen generating unit 1. For example, the hydro-desulfurizer 7 is configured to be heated via a dividing wall by the hydrogen-containing gas generated by the reformer (not shown). In addition to the heat transfer from the hydrogen generating unit 1, the hydro-desulfurizer 7 may be heated by a heater, such as an electric heater, provided additionally.

In the present embodiment, the hydrogen generating unit 1 is provided with only the reformer (not shown) configured to cause the reforming reaction using the raw material gas and the steam. However, as a CO reducer configured to reduce the carbon monoxide in the hydrogen-containing gas generated by the reformer, at least one of a shift converter configured to reduce the carbon monoxide by the shift reaction and a CO remover configured to reduce the carbon monoxide by the oxidation reaction or the methanation reaction may be provided.

The hydrogen-containing gas generated by the hydrogen generating unit 1 is supplied to the hydrogen utilizing device. Examples of the hydrogen utilizing device are a hydrogen storage container, a fuel cell, and the combustor 3.

The controller 20 is a device configured to control the hydrogen generator 100. The controller 20 may be any device as long as it has a control function. The controller 20 includes a calculation processing portion (not shown) and a storage portion (not shown) storing a control program. Examples of the calculation processing portion are a microprocessor and a CPU. One example of the storage portion is a memory. The controller 20 may be constituted by a single controller or may be constituted by a plurality of controllers which are arranged in a distributed manner and cooperate to perform control operations.

Next, a characteristic configuration of the hydrogen generator 100 of the present embodiment will be explained.

The hydrogen generator 100 of the present embodiment is characterized in that: as described above, the raw material gas supply unit 6 is disposed between the hydro-desulfurizer 7 and the meeting point where the first gas channel 5 and the recycle channel 10 meet; and the first on-off valve 8 configured to be closed by the controller 20 when the hydrogen generator stops is disposed between the raw material gas supply unit 6 and the hydro-desulfurizer 7.

With this, as compared to the conventional hydrogen generator, it is possible to prevent the hydrogen sulfide remaining in the hydro-desulfurizer 7 from flowing back to the raw material gas supply unit 6 by the evaporation of the water remaining in the hydrogen generating unit 1 when the hydrogen generator stops. Thus, the corrosion of the raw material gas supply unit 6 can be suppressed more than before.

Moreover, in order to prevent the hydrogen sulfide from flowing back to the raw material gas supply unit 6, an on-off valve may be disposed on the first gas channel 5 located downstream of the hydro-desulfurizer 7. However, since the hydro-desulfurizer 7 is normally used at a high temperature of about 300° C., there is a possibility that the heat deterioration of the on-off valve occurs. As in the present embodiment, by providing the first on-off valve 8 between the hydro-desulfurizer 7 and the raw material gas supply unit 6, the corrosion of the raw material gas supply unit 6 can be suppressed while suppressing the heat deterioration of the on-off valve.

In the hydrogen generator 100 of the present embodiment, an on-off valve is not disposed on the first gas channel 5 other than the first on-off valve 8. However, an on-off valve may be disposed on the first gas channel 5 other than the first on-off valve 8. From the viewpoint of the above heat deterioration, it is preferable that the first on-off valve 8 be configured as an extreme downstream on-off valve. However, the first on-off valve 8 may not be the extreme downstream on-off valve.

Next, the operations of the hydrogen generator 100 of the present embodiment when the hydrogen generator 100 stops will be explained.

Figure 3:
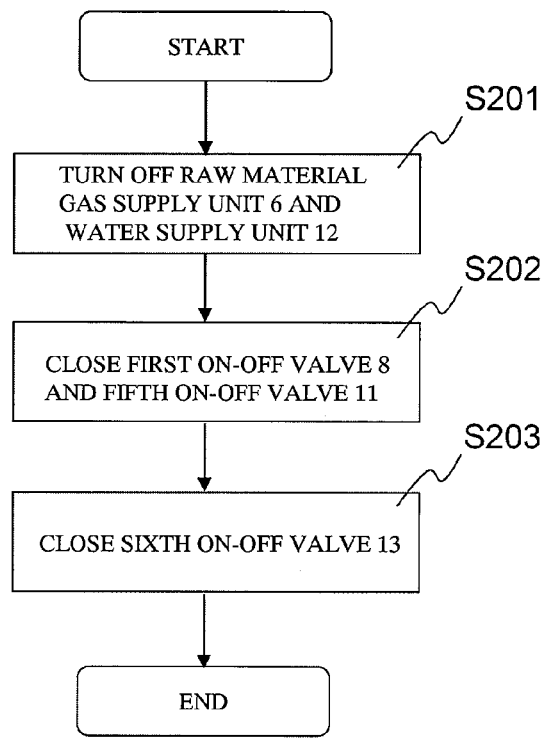
FIG. 3 is a diagram showing one example of an operation flow of the hydrogen generator of Embodiment 2 when the hydrogen generator stops.

FIG. 3 is a diagram showing one example of an operation flow of the hydrogen generator 100 when the hydrogen generator 100 stops.

As shown in FIG. 3, when the hydrogen generator 100 stops, first, the controller 20 stops the operations of the raw material gas supply unit 6 and the water supply unit 12 (Step S201). Next, the controller 20 closes the first on-off valve 8 and the fifth on-off valve 11 (Step S202), and then closes the sixth on-off valve 13 (Step S203). After that, the controller 20 executes the other stop operations, such as the stop of the combustion operation of the combustor 3, to terminate a stop process.

In the above operation flow, the first on-off valve 8 is closed before the sixth on-off valve 13 is closed. However, the first on-off valve 8 and the sixth on-off valve 13 may be closed at the same time. To be specific, it is preferable that the first on-off valve 8 be closed before the sixth on-off valve 13 is closed. By closing the sixth on-off valve 13, the communication between the hydrogen generating unit 1 and the atmosphere is blocked. When the water remaining in the hydrogen generating unit 1 evaporates by remaining heat, the internal pressure of the hydrogen generating unit 1 increases. By this increase in the internal pressure, there is a possibility that the hydrogen sulfide remaining in the hydro-desulfurizer 7 flows into the raw material gas supply unit 6 to cause the corrosion of the raw material gas supply unit 6. In the present embodiment, since the first on-off valve 8 is closed, such possibility is suppressed.

The first on-off valve 8 may be closed after the sixth on-off valve 13 is closed, because the corrosion of the raw material gas supply unit 6 is suppressed as compared to the conventional hydrogen generator.

Embodiment 3

The hydrogen generator of Embodiment 3 is configured such that the hydrogen generator of one of Embodiments 1 and 2 further includes: a normal temperature desulfurizer configured to remove the sulfur compound in the raw material gas supplied to the hydrogen generating unit; a second gas channel configured to branch at a point located upstream of the hydro-desulfurizer, pass through the normal temperature desulfurizer, and meet the first gas channel located upstream of the meeting point where the first gas channel and the recycle channel meet; a second on-off valve disposed on the second gas channel; and a third on-off valve disposed on the first gas channel extending between a branching point where the second gas channel branches from the first gas channel and a meeting point where the second gas channel meets the first gas channel.

This configuration is one example in which both the normal temperature desulfurizer and the hydro-desulfurizer are used.

Each of the on-off valves may be a solenoid valve which simply switches between open and close or may be a flow rate control valve which can close (the same is true for the other embodiments and modification examples).

The hydrogen generator of Embodiment 3 may further include a controller configured to: open the first on-off valve and the third on-off valve and close the second on-off valve when desulfurization is performed by using the hydro-desulfurizer; and open the first on-off valve and the second on-off valve and close the third on-off valve when the desulfurization is performed by using the normal temperature desulfurizer.

By controlling the above on-off valves, the use of the normal temperature desulfurizer and the use of the hydro-desulfurizer can be suitably switched.

In the hydrogen generator of Embodiment 2, the first on-off valve may be disposed as an extreme downstream valve among valves disposed on the first gas channel.

In accordance with this configuration, since an on-off valve is not disposed downstream of the hydro-desulfurizer 7, the heat deterioration of the on-off valves disposed on the first gas channel can be suppressed.

The fuel cell system of Embodiment 3 includes any one of the hydrogen generators of Embodiment 3 and the fuel cell configured to generate the hydrogen-containing gas supplied from the hydrogen generator.

Other than the above characteristics, the hydrogen generator and fuel cell system of the present embodiment may be the same in configuration as any of the hydrogen generators and fuel cell systems of Embodiments 1 and 2.

Figure 4:
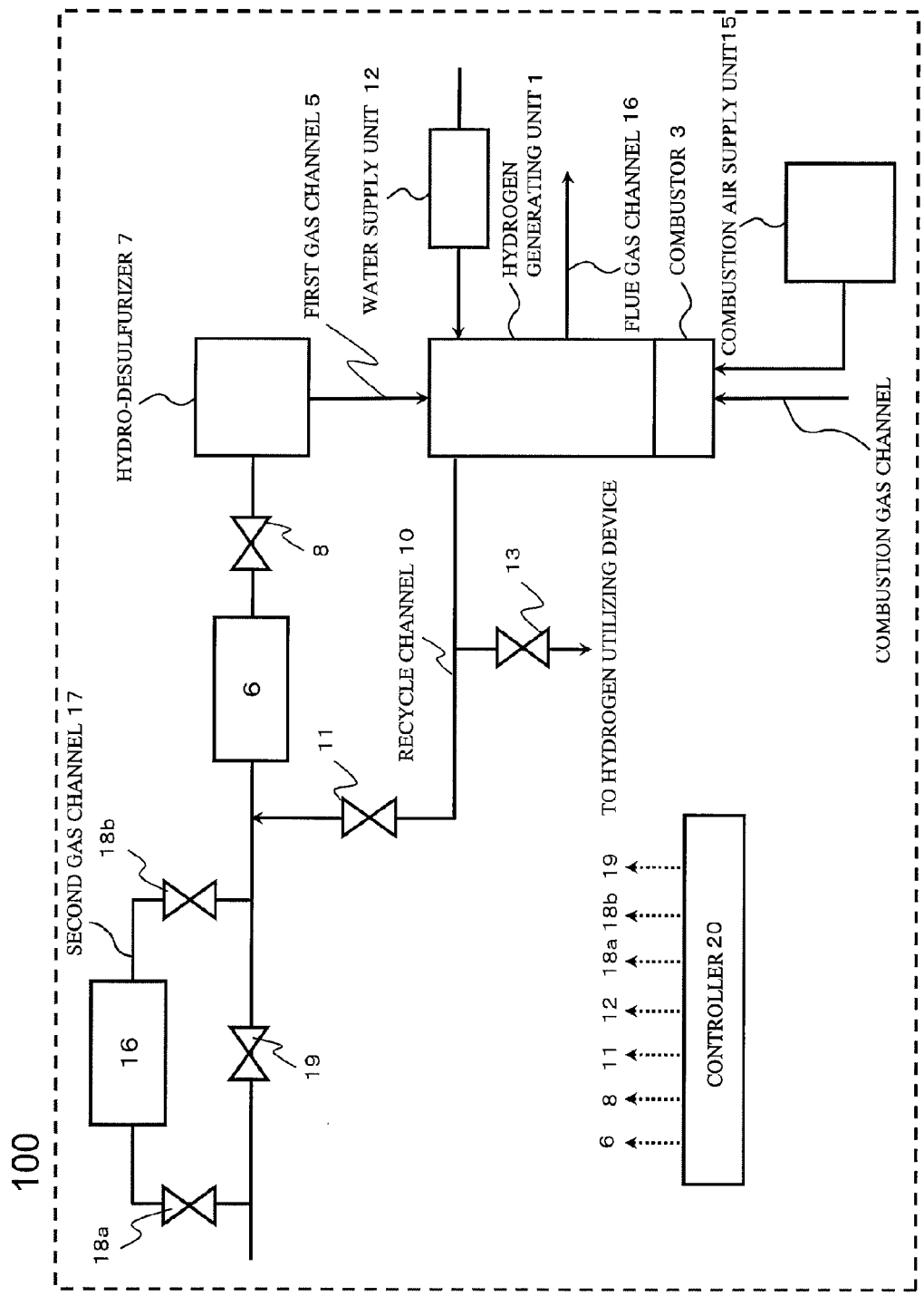
FIG. 4 is a diagram showing one example of the schematic configuration of the hydrogen generator of Embodiment 3.

Next, the hydrogen generator 100 of Embodiment 3 will be explained. FIG. 4 is a diagram showing one example of the schematic configuration of the hydrogen generator 100 according to Embodiment 3.

As shown in FIG. 4, the hydrogen generator of the present embodiment is characterized by including, as a device configured to remove the sulfur compound in the raw material gas, a normal temperature desulfurizer 26 in addition to the hydro-desulfurizer 7. The normal temperature desulfurizer 26 is constituted by a container in which a normal temperature desulfurizing agent is filled, the normal temperature desulfurizing agent physically adsorbing the sulfur compound in the raw material gas at normal temperature. Here, the normal temperature desulfurizing agent may be a desulfurizing agent which is effective in, of course, the normal temperature range, and also at temperatures higher than the normal temperature range. For example, a metal (such as Ag) supporting zeolite-based desulfurizing agent is used. In the case of using the zeolite in the desulfurizing agent, the desulfurizing agent is effective in a temperature range from the normal temperature range to about 70° C. To be specific, the "normal temperature" of each of the normal temperature desulfurizing agent and the normal temperature desulfurizer is used since it is relatively closer to the normal temperature range than the operating temperature (normally about 300° C.) of a hydro-desulfurizing agent. Thus, the "normal temperature" of each of the normal temperature desulfurizing agent and the normal temperature desulfurizer denotes a temperature range from the normal temperature range up to a temperature at which the desulfurizing agent used herein effectively functions as a desulfurizing agent.

The normal temperature desulfurizer 26 is disposed on a second gas channel 17 configured to: branch at a point located upstream of the meeting point where the first gas channel 5 and the recycle channel 10 meet; and meet the first gas channel 5 located upstream of the meeting point where the first gas channel 5 and the recycle channel 10 meet.

A second on-off valve 18a and a second on-off valve 18b are disposed on the second gas channel 17. A third on-off valve 19 is disposed on the first gas channel 5 extending between the branching point where the second gas channel 17 branches from the first gas channel 5 and the meeting point where the second gas channel 17 meets the first gas channel 5. As shown in FIG. 4, the second on-off valve 18a and the second on-off valve 18b are respectively disposed on upstream and downstream sides of the normal temperature desulfurizer 26. In the present embodiment, the second on-off valve 18a and the second on-off valve 18b are disposed on the second gas channel 17. However, only one of the second on-off valve 18a and the second on-off valve 18b may be disposed on the second gas channel 17. This is because even if only one of the second on-off valve 18a and the second on-off valve 18b is disposed on the second gas channel 17, it can function as a switching unit configured to switch the flow of the raw material gas between the first gas channel 5 and the second gas channel 17, by switching the open-close state thereof and the open-close state of the third on-off valve 19.

It is preferable that the first on-off valve 8 be disposed as an extreme downstream valve among the valves disposed on the first gas channel 5. However, the first on-off valve 8 may not be the extreme downstream valve. When the first on-off valve 8 is disposed as the extreme downstream valve, the heat deterioration of the on-off valves disposed on the first gas channel can be suppressed. This is because an on-off valve is not disposed downstream of the hydro-desulfurizer 7.

Next, a method for operating the hydrogen generator 100 configured as above will be explained.

In the hydrogen generator 100 of the present embodiment, when the sulfur compound in the raw material gas is desulfurized by using the hydro-desulfurizer 7, the controller 20 opens the first on-off valve 8 and the third on-off valve 19 and closes the second on-off valve 18a and the second on-off valve 18b. After that, in order to add the hydrogen to the raw material gas flowing into the hydro-desulfurizer 7, the controller 20 opens the fifth on-off valve 11 to allow the hydrogen-containing gas generated by the hydrogen generating unit 1 to flow through the recycle channel 10 into the first gas channel 5 located upstream of the raw material gas supply unit 6.

In contrast, when the sulfur compound in the raw material gas is desulfurized by using the normal temperature desulfurizer 26, the controller 20 opens the first on-off valve 8, the second on-off valve 18a, and the second on-off valve 18b and closes the third on-off valve 19. After that, the controller 20 closes the fifth on-off valve 11 to prevent the hydrogen-containing gas from flowing through the recycle channel 10 into the first gas channel 5 located upstream of the raw material gas supply unit 6.

It is preferable that: the hydro-desulfurizer 7 desulfurize the sulfur compound in the raw material gas after the temperature of the hydro-desulfurizer 7 is increased up to its operating temperature; and before the temperature of the hydro-desulfurizer 7 reaches the operating temperature, the normal temperature desulfurizer 26 desulfurize the sulfur compound in the raw material gas.

Modification Example 1

The hydrogen generator according to Modification Example 1 of Embodiment 3 is configured such that the hydrogen generator of one of Embodiments 1 and 2 further includes: a normal temperature desulfurizer configured to remove the sulfur compound in the raw material gas supplied to the hydrogen generating unit; a second gas channel configured to branch from the first gas channel extending between the raw material gas supply unit and the first on-off valve, pass through the normal temperature desulfurizer, and meet the first gas channel located downstream of the hydro-desulfurizer; and a second on-off valve disposed on the second gas channel.

This configuration is one example in which both the hydro-desulfurizer and the normal temperature desulfurizer are used.

The hydrogen generator according to Modification Example 1 of Embodiment 3 may further include a controller configured to: open the first on-off valve and close the second on-off valve when desulfurization is performed by using the hydro-desulfurizer; and open the second on-off valve and close the first on-off valve when the desulfurization is performed by using the normal temperature desulfurizer.

By controlling the above on-off valves, the use of the normal temperature desulfurizer and the use of the hydro-desulfurizer can be suitably switched.

The fuel cell system according to Modification Example 1 of Embodiment 3 includes the hydrogen generator of the present modification example and the fuel cell configured to generate electric power by using the hydrogen-containing gas supplied from the hydrogen generator.

Other than the above characteristics, the hydrogen generator and fuel cell system of the present modification example may be respectively the same in configuration as the hydrogen generator and fuel cell system of one of Embodiments 1 and 2.

Next, Modification Example 1 of the hydrogen generator 100 of Embodiment 3 will be explained.

Figure 5:
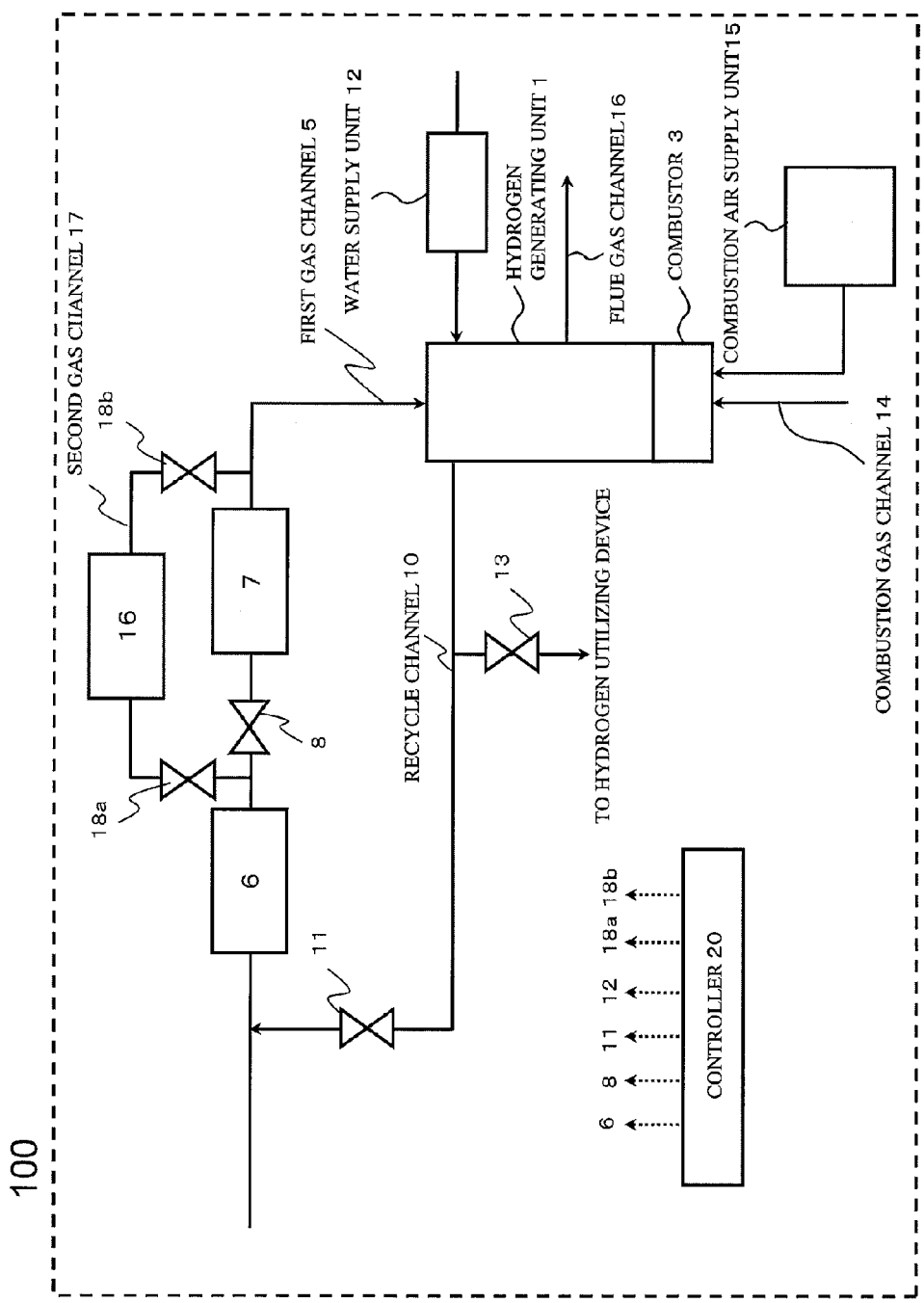
FIG. 5 is a diagram showing one example of the schematic configuration of Modification Example 1 of the hydrogen generator of Embodiment 3.

FIG. 5 is a diagram showing one example of the schematic configuration of the hydrogen generator 100 of the present modification example.

As shown in FIG. 5, the hydrogen generator 100 of the present modification example includes the normal temperature desulfurizer 26 in addition to the hydro-desulfurizer 7, as with Embodiment 3. However, the present modification example is different from Embodiment 3 regarding the position of the second gas channel 17 and the switching unit configured to switch the channel through which the raw material gas flows, between the first gas channel 5 and the second gas channel 17.

Specifically, the second gas channel 17 is configured to branch from the first gas channel 5 extending between the raw material gas supply unit 6 and the first on-off valve 8, pass through the normal temperature desulfurizer 26, and meet the first gas channel 5 located downstream of the hydro-desulfurizer 7. As with Embodiment 3, the second on-off valve 18a and the second on-off valve 18b are disposed on the second gas channel 17.

In the present modification example, a function of switching the flow of the raw material gas between the first gas channel 5 and the second gas channel 17 can be realized by switching the open-close states of the second on-off valve 18a, the second on-off valve 18b, and the first on-off valve 8. To be specific, the second on-off valve 18a, the second on-off valve 18b, and the first on-off valve 8 constitute the above switching unit.

As with Embodiment 3, in the hydrogen generator 100 of the present modification example, only one of the second on-off valve 18a and the second on-off valve 18b may be disposed on the second gas channel 17. This is because even if only one of the second on-off valve 18a and the second on-off valve 18b is disposed on the second gas channel 17, it can function as the switching unit. In consideration of the suppression of the heat deterioration of the on-off valve, it is more preferable to dispose only the second on-off valve 18a.

Next, the method for operating the hydrogen generator 100 configured as above will be explained.

In the hydrogen generator 100 of the present modification example, when the sulfur compound in the raw material gas is desulfurized by using the hydro-desulfurizer 7, the controller 20 opens the first on-off valve 8 and closes the second on-off valve 18a and the second on-off valve 18b. After that, in order to add the hydrogen to the raw material gas flowing into the hydro-desulfurizer 7, the controller 20 opens the fifth on-off valve 11 to allow the hydrogen-containing gas generated by the hydrogen generating unit 1 to flow through the recycle channel 10 into the first gas channel 5 located upstream of the raw material gas supply unit 6.

In contrast, when the sulfur compound in the raw material gas is desulfurized by using the normal temperature desulfurizer 26, the controller 20 opens the second on-off valve 18a and the second on-off valve 18b and closes the first on-off valve 8. After that, the controller 20 closes the fifth on-off valve 11 to prevent the hydrogen-containing gas from flowing through the recycle channel 10 into the first gas channel 5 located upstream of the raw material gas supply unit 6.

As with the hydrogen generator of Embodiment 3, it is preferable that: the hydro-desulfurizer 7 desulfurize the sulfur compound in the raw material gas after the temperature of the hydro-desulfurizer 7 is increased up to its operating temperature; and before the temperature of the hydro-desulfurizer 7 reaches the operating temperature, the normal temperature desulfurizer 26 desulfurize the sulfur compound in the raw material gas.

Modification Example 2

The hydrogen generator according to Modification Example 2 of Embodiment 3 is configured such that the hydrogen generator of Embodiment 3 further includes: a third channel configured to branch from the first gas channel extending between the raw material gas supply unit and the hydro-desulfurizer and meet the first gas channel located downstream of the hydro-desulfurizer; and a fourth on-off valve disposed on the third channel.

The hydrogen generator according to Modification Example 2 of Embodiment 3 may further include a controller configured to: open the first on-off valve and the third on-off valve and close the second on-off valve and the fourth on-off valve when desulfurization is performed by using the hydro-desulfurizer; and open the second on-off valve and the fourth on-off valve and close the first on-off valve and the third on-off valve when the desulfurization is performed by using the normal temperature desulfurizer.

In accordance with this configuration, the hydro-desulfurizer can be bypassed when the normal temperature desulfurizer is performing the desulfurization. Therefore, the sulfur compound which has not been removed from the raw material gas by the normal temperature desulfurizer is prevented from being trapped by the hydro-desulfurizer.

The fuel cell system according to Modification Example 2 of Embodiment 3 includes the hydrogen generator of Modification Example 2 and the fuel cell configured to generate electric power by using the hydrogen-containing gas supplied from the hydrogen generator.

Other than the above characteristics, the hydrogen generator and fuel cell system of the present modification example may be respectively the same in configuration as the hydrogen generator and fuel cell system of one of Embodiment 1, Modification Example 1 of Embodiment 1, Embodiment 2, and Modification Example 1 of Embodiment 2.

Next, Modification Example 2 of the hydrogen generator 100 of Embodiment 3 will be explained.

Figure 6:
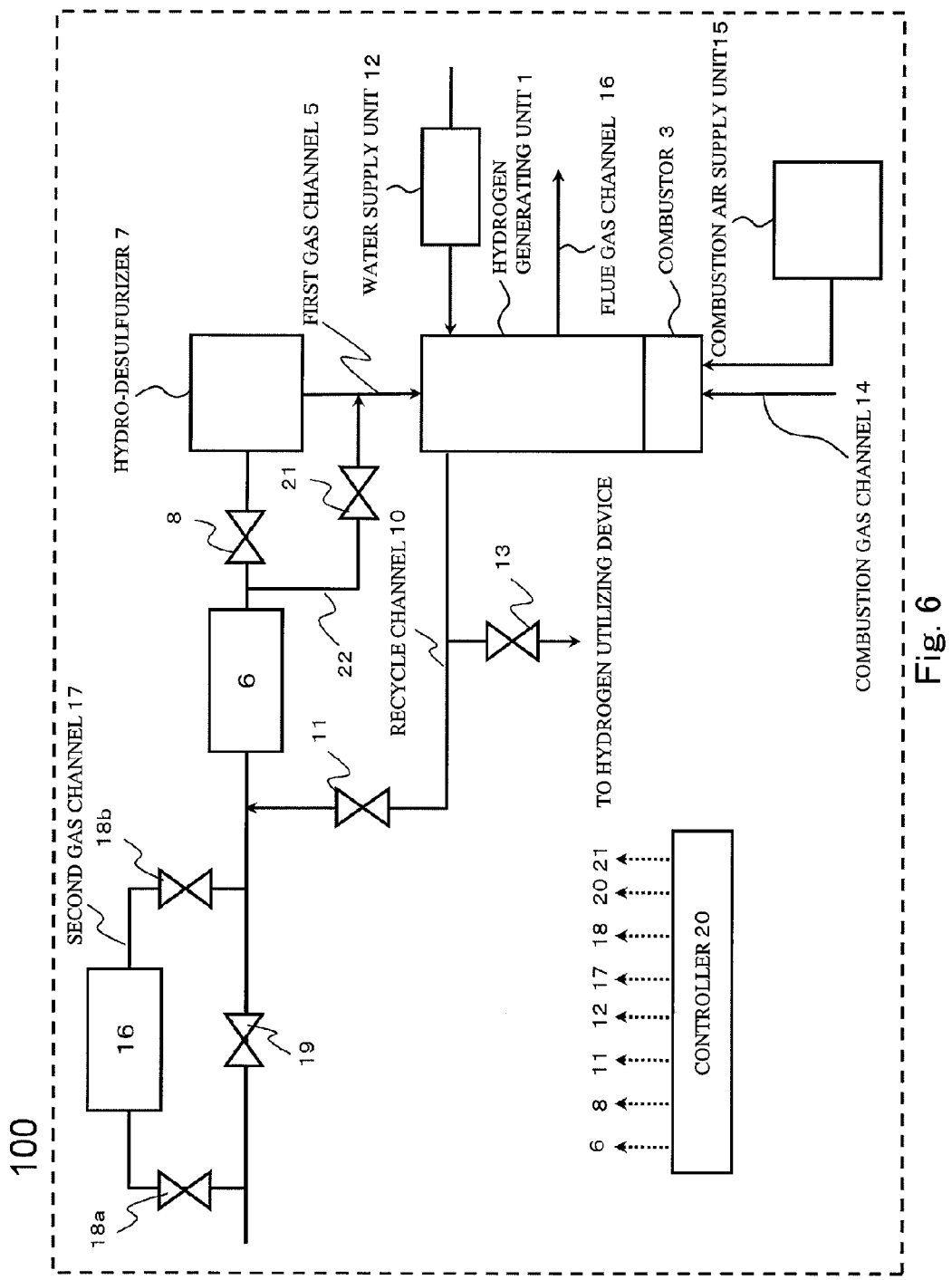
FIG. 6 is a diagram showing one example of the schematic configuration of Modification Example 2 of the hydrogen generator of Embodiment 3.

FIG. 6 is a diagram showing one example of the schematic configuration of the hydrogen generator 100 of the present modification example.

As shown in FIG. 6, the hydrogen generator 100 of the present modification example includes the normal temperature desulfurizer 26 in addition to the hydro-desulfurizer 7, as with Embodiment 3. However, the hydrogen generator 100 of the present modification example is different from that of Embodiment 3 in that the hydrogen generator 100 of the present modification example includes: a third gas channel 22 through which the raw material gas flows, the raw material gas flowing through the raw material gas supply unit 6, bypassing the hydro-desulfurizer 7, and being supplied to the hydrogen generating unit 1; and a fourth on-off valve 21 disposed on the third gas channel 22.

Specifically, the third gas channel 22 is configured to branch from the first gas channel 5 extending between the raw material gas supply unit 6 and the first on-off valve 8, bypass the hydro-desulfurizer 7, and meet the first gas channel 5 located downstream of the hydro-desulfurizer 7. The fourth on-off valve 21 is disposed on the third gas channel 22.

In Modification Example 2, the function of the switching unit configured to switch the flow of the raw material gas, having flowed through the raw material gas supply unit 6, between the first gas channel 5 and the third gas channel 22 can be realized by switching the open-close states of the first on-off valve 8 and the fourth on-off valve 21. To be specific, the first on-off valve 8 and the fourth on-off valve 21 constitute the switching unit.

Next, the method for operating the hydrogen generator 100 configured as above will be explained.

In the hydrogen generator 100 of the present modification example, when the sulfur compound in the raw material gas is desulfurized by using the hydro-desulfurizer 7, the controller 20 opens the first on-off valve 8 and the third on-off valve 19 and closes the second on-off valve 18a, the second on-off valve 18b, and the fourth on-off valve 21. After that, in order to add the hydrogen to the raw material gas flowing into the hydro-desulfurizer 7, the controller 20 opens the fifth on-off valve 11 to allow the hydrogen-containing gas generated by the hydrogen generating unit 1 to flow through the recycle channel 10 into the first gas channel 5 located upstream of the raw material gas supply unit 6.

Moreover, in the hydrogen generator 100 of the present modification example, when the sulfur compound in the raw material gas is desulfurized by using the normal temperature desulfurizer 26, the controller 20 opens the second on-off valve 18a, the second on-off valve 18b, and the fourth on-off valve 21 and closes the first on-off valve 8 and the third on-off valve 19. After that, the controller 20 closes the fifth on-off valve 11 to prevent the hydrogen-containing gas from flowing through the recycle channel 10 into the first gas channel 5 located upstream of the raw material gas supply unit 6.

As above, by preventing the raw material gas desulfurized by the normal temperature desulfurizer 26 from flowing through the hydro-desulfurizer 7, the sulfur compound which has not been removed from the raw material gas by the normal temperature desulfurizer 26 is prevented from being trapped by the hydrodesulfurization catalyst. There is a possibility that after the switching is performed from the normal temperature desulfurizer 26 to the hydro-desulfurizer 7, a part of the trapped sulfur compound flows into the reformer and deteriorates a reforming catalyst. In the hydrogen generator of the present modification example, such possibility is reduced.

As with the hydrogen generator of Embodiment 3, the hydro-desulfurizer 7 desulfurizes the sulfur compound in the raw material gas after the temperature of the hydro-desulfurizer 7 is increased up to its operating temperature. It is preferable that the normal temperature desulfurizer 26 desulfurize the sulfur compound in the raw material gas before the temperature of the hydro-desulfurizer 7 reaches the operating temperature.

Embodiment 4

Next, the fuel cell system of Embodiment 4 will be explained.

Figure 7:
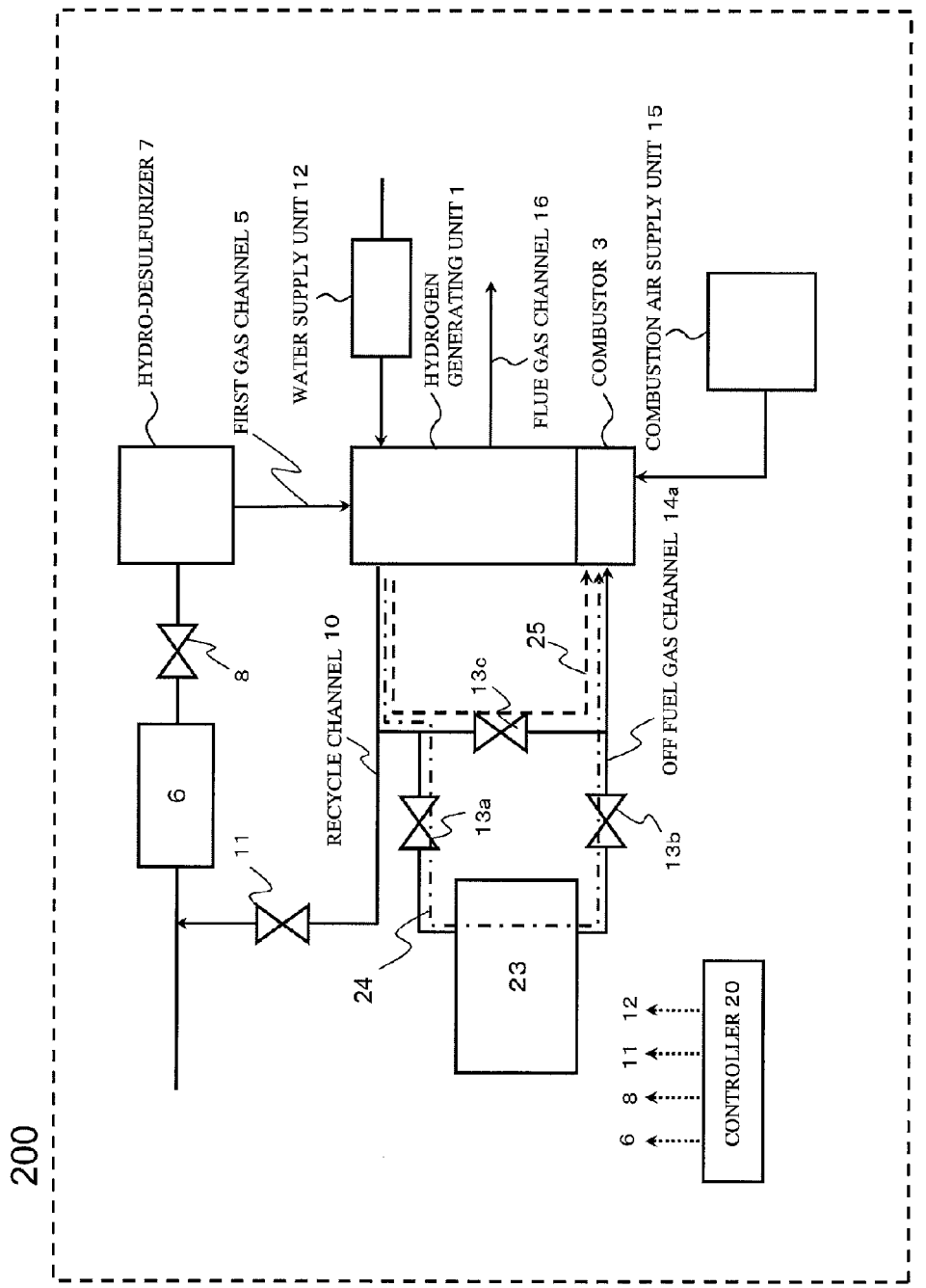
FIG. 7 is a diagram showing one example of the schematic configuration of a fuel cell system of Embodiment 4.

FIG. 7 is a diagram showing one example of the schematic configuration of the fuel cell system of the fuel cell system of Embodiment 4. As shown in FIG. 7, a fuel cell system 200 of the present embodiment includes: the hydrogen generator of Embodiment 2; a fuel cell 23 that is the hydrogen utilizing device configured to utilize the hydrogen-containing gas supplied from the hydrogen generator; a fourth gas channel 24 through which the hydrogen-containing gas flowing through the fuel cell 23 flows; and a fifth gas channel 25 through which the hydrogen-containing gas flows, the hydrogen-containing gas bypassing the fuel cell 23 and being supplied to the combustor 3. Further, as on-off valves disposed on a gas channel configured to communicate with the atmosphere through the hydrogen utilizing device, the fuel cell system 200 of the present embodiment includes a sixth on-off valve 13a, a sixth on-off valve 13b, and a sixth on-off valve 13c. Here, the sixth on-off valve 13a and the sixth on-off valve 13b are on-off valves disposed on the fourth gas channel 24 which communicates with the atmosphere through the fuel cell 23 as the hydrogen utilizing device, and the sixth on-off valve 13c is an on-off valve disposed on the fifth gas channel 25 which communicates with the atmosphere through the combustor 3 as the hydrogen utilizing device.

Figure 8:
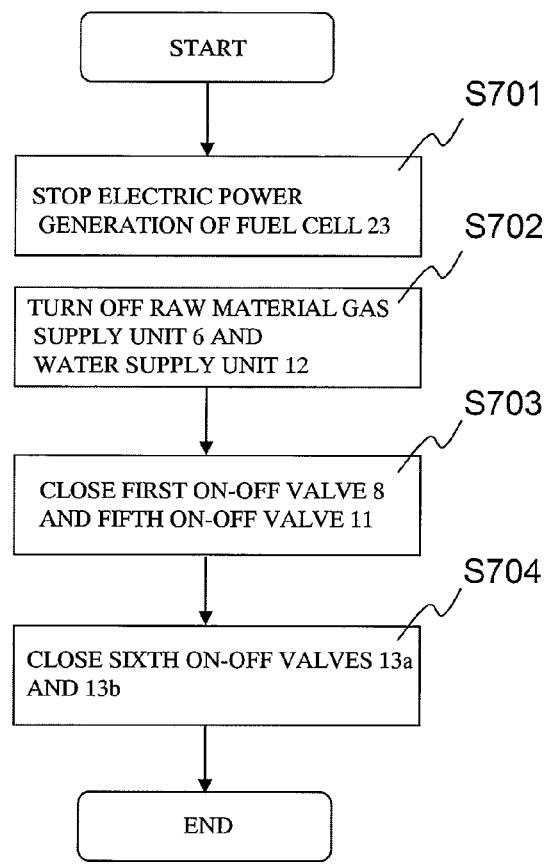
FIG. 8 is a diagram showing one example of the operation flow of the fuel cell system of Embodiment 4 when the fuel cell system stops.

Next, the operation flow of the fuel cell system 200 of the present embodiment when the fuel cell system 200 stops will be explained. FIG. 8 is a diagram showing the operation flow of the fuel cell system when the fuel cell system stops.

As shown in FIG. 8, when the fuel cell system stops, first, the controller 20 stops the electric power generation of the fuel cell 23 (Step S701) and stops the operations of the raw material gas supply unit 6 and the water supply unit 12 (Step S702). Next, the controller 20 closes the first on-off valve 8 and the fifth on-off valve 11 (Step S703), and then closes the sixth on-off valve 13a and the sixth on-off valve 13b (Step S704). After that, the controller 20 executes the other stop operations, such as the stop of the combustion operation of the combustor 3, to terminate the stop process.

In the above operation flow, the first on-off valve 8 is closed before the sixth on-off valve 13a and the sixth on-off valve 13b are closed. However, the first on-off valve 8, the sixth on-off valve 13a, and the sixth on-off valve 13b may be closed at the same time. To be specific, it is preferable that the first on-off valve 8 be closed before the sixth on-off valve 13a and the sixth on-off valve 13b are closed. The communication between the hydrogen generating unit 1 and the atmosphere is blocked by closing the sixth on-off valve 13a and the sixth on-off valve 13b, since the sixth on-off valve 13c has already been closed during the electric power generating operation of the fuel cell system 200. When the water remaining in the hydrogen generating unit 1 evaporates by the remaining heat, there is a possibility that the internal pressure of the hydrogen generating unit 1 increases, and the hydrogen sulfide remaining in the hydro-desulfurizer 7 flows into the raw material gas supply unit 6 to cause the corrosion of the raw material gas supply unit 6. However, since the first on-off valve 8 is closed, such possibility is suppressed.

The first on-off valve 8 may be closed after the sixth on-off valve 13 is closed, since the corrosion of the raw material gas supply unit 6 is suppressed as compared to the conventional fuel cell system.

Embodiment 5

First, the configuration of a hydrogen generator 300 of Embodiment 5 of the present invention and the configuration of a fuel cell system 400 including the hydrogen generator 300 will be explained.

Figure 9:
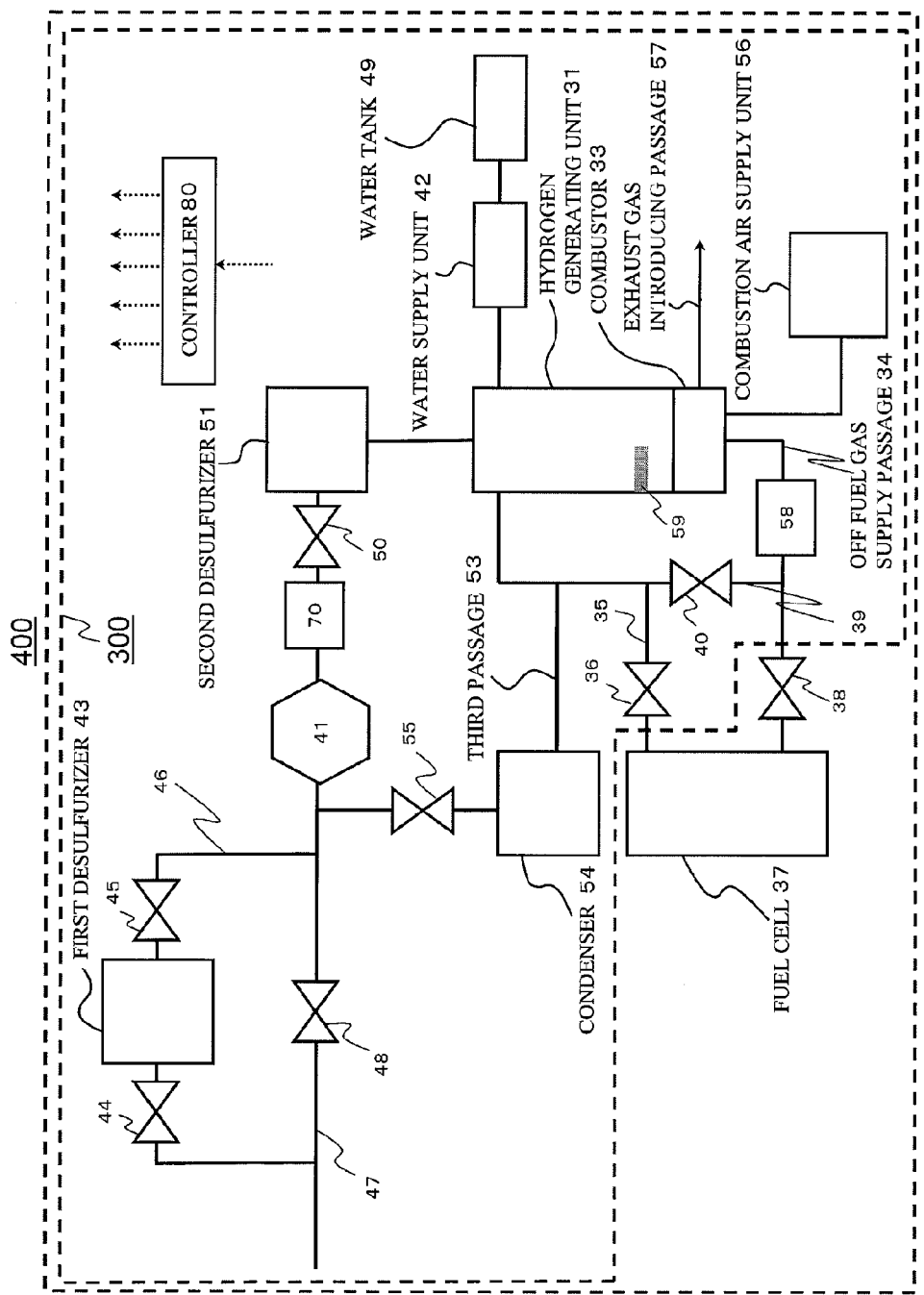
FIG. 9 is a diagram showing one example of the schematic configuration of the hydrogen generator and fuel cell system of Embodiment 5.

FIG. 9 is a configuration diagram of the hydrogen generator 300 of Embodiment 5 of the present invention and the fuel cell system 400 including the hydrogen generator 300. The hydrogen generator 300 is a device configured to mainly cause the reforming reaction between the raw material gas and the steam to generate the hydrogen-containing gas used in, for example, the fuel cell. The raw material gas contains the organic compound constituted by at least carbon and hydrogen, and examples of the raw material gas are hydrocarbons, such as a city gas containing methane as a major component, a natural gas, and a LPG.

A hydrogen generating unit 31 is provided with a reformer (not shown) configured to cause the reforming reaction using the raw material gas and the steam. Although the hydrogen generating unit 31 of the present embodiment is provided with only the reformer, it may be further provided with a shift converter (not shown) configured to reduce by the shift reaction the carbon monoxide in the hydrogen-containing gas generated by the reformer and a CO remover (not shown) configured to reduce mainly by the oxidation reaction the carbon monoxide in the hydrogen-containing gas having flowed through the shift converter.

In the case of providing the CO remover, an air supply unit is provided, which is configured to supply the air, used in the oxidation reaction, to the hydrogen-containing gas having flowed through the shift converter. A combustor 33 configured to supply heat to the reformer is provided, the heat being used to cause the reforming reaction between the raw material gas and the steam.

An on-off valve 36 is disposed on a fuel gas supply passage 35 extending from the hydrogen generating unit 31, and the fuel gas supply passage 35 is connected to a fuel cell 37. An off fuel gas supply passage 34 is formed to introduce the fuel gas, discharged from the fuel cell 37, to the combustor 33, and an on-off valve 38 is disposed on the off fuel gas supply passage 34. In addition, a bypass passage 39 is formed as a passage configured to bypass the fuel cell 37 and be connected to the off fuel gas supply passage 34, and an on-off valve 40 is disposed on the bypass passage 39.

A raw material gas supply unit configured to supply the raw material gas to the hydrogen generating unit 31 (reformer) and a water supply unit 42 configured to supply the water to the hydrogen generating unit 31 (reformer) are provided. The raw material gas supply unit is a device configured to adjust the flow rate of the raw material gas supplied to the hydrogen generating unit 31 (reformer). In the present embodiment, the raw material gas supply unit is constituted by a booster 41 (for example, a booster pump) and a flow rate control valve 70. However, the raw material gas supply unit is not limited to this. The raw material gas supply unit may be constituted by one of the booster 41 and the flow rate control valve 70. The water supply unit 42 is a device configured to adjust the flow rate of the water supplied to the hydrogen generating unit 31 (reformer). In the present embodiment, a pump is used as the water supply unit 42.

Used as a supply source of the raw material gas is a city gas infrastructure line. The raw material gas supplied from the infrastructure line flows through the first desulfurizer 43 to be supplied to the raw material gas supply unit. The first desulfurizer 43 is filled with the desulfurizing agent which removes by physical adsorption the sulfur compound in the raw material gas. An on-off valve 44 and an on-off valve 45 are respectively disposed on upstream and downstream sides of the first desulfurizer 43. The raw material gas having flowed through the first desulfurizer 43 flows through a first passage 46 to be supplied to the hydrogen generating unit 31 (reformer). Examples of the desulfurizing agent filled in the first desulfurizer 43 are zeolite-based adsorbent in which Ag is ion-exchanged and which removes an odorous component, and activated carbon which removes the odorous component.

A second passage 47 is formed as a passage through which the raw material gas bypasses the first desulfurizer 43 and flows through a second desulfurizer 51 to be supplied to the hydrogen generating unit 31, and an on-off valve 48 is disposed on the second passage 47. A water tank 49 is provided as a water supply source. An on-off valve 50 and the second desulfurizer 51 are provided downstream of the raw material gas supply unit, and the hydrogen generating unit 31 (reformer) is disposed on a passage located downstream of the on-off valve 50 and the second desulfurizer 51

The second desulfurizer 51 is filled with the hydro-desulfurizing agent. For example, the hydro-desulfurizing agent is constituted by: a CoMo-based catalyst for converting the sulfur compound in the raw material gas into the hydrogen sulfide, and a ZnO-based catalyst or a CuZn-based catalyst, which is an adsorbent for adsorbing the converted hydrogen sulfide; or a Cu—Zn—Ni-based or Cu—Zn—Fe-based catalyst as a catalyst species having both a function of converting the sulfur compound into the hydrogen sulfide and a function of adsorbing the hydrogen sulfide. Moreover, the first passage 46 and the second passage 47 meets at a point located upstream of the raw material gas supply unit, and are constituted as a common passage from this meeting point up to the hydrogen generating unit 31. The configurations of the first passage 46 and the second passage 47 are not limited to this. For example, the first passage 46 and the second passage 47 may be configured so as to branch and be individually connected to the hydrogen generating unit 31 without meeting.

A third passage 53 is formed to branch from the fuel gas supply passage 35. The third passage 53 passes through a condenser 54 and an on-off valve 55 to be connected to a point located upstream of the raw material gas supply unit. A part of the hydrogen-containing gas from the hydrogen generating unit 31 is recycled and supplied to the raw material gas supplied to the second desulfurizer 51. If the dew point of the gas to be recycled is high, the hydro-desulfurizing agent adsorbs the steam and its desulfurization function deteriorates. Therefore, the condenser 54 lowers the dew point.

A combustion air supply unit 56 configured to supply the combustion air to the combustor 33 is a blower and can adjust the flow rate of the combustion air. Although the combustor includes an ignition unit (for example, an ignitor) necessary for ignition and a combustion detector (for example, a flame rod) configured to detect a combustion state, these are common technologies, so that details thereof are not shown. The exhaust gas generated by the combustor is discharged through an exhaust gas introducing passage 57 to the atmosphere.

A condenser 58 is disposed on the off fuel gas supply passage 34. By lowering the steam partial pressure of the reformed gas, the off fuel gas combusts more stably.

Moreover, the reformer filled with the reforming catalyst is provided in the hydrogen generating unit 31. A first temperature detector 59 is also provided to detect the temperature of the reformer. Used as the detector is a thermocouple, a thermistor, or the like.

Moreover, a controller 80 is provided, to which a detection value is input from the first temperature detector 59 and which controls the amount of raw material gas supplied from the raw material gas supply unit, the amount of water supplied from the water supply unit 42, the combustion air supply unit 56, the on-off valve 36, the on-off valve 38, the on-off valve 40, and the like. The controller 80 uses a semiconductor memory, a CPU, and the like to store operation information and the like, such as an operation sequence of the hydrogen generator 300 and an integrated flow amount of raw material gas, calculate operating conditions appropriate for situations, and give the operating conditions to components, such as the water supply unit 42 and the raw material gas supply unit, necessary for the operations of the system.

Next, the operations of the hydrogen generator 300 of Embodiment 5 and the fuel cell system 400 including the hydrogen generator 300 will be explained. The following operations are executed based on the control of the controller 80.

First, a start-up operation of the hydrogen generator 300 of the present embodiment will be explained.

When the hydrogen generator 300 starts up from a stop state, the on-off valve 44, the on-off valve 45, and the on-off valve 50 open and the raw material gas supply unit is activated by commands from the controller 80. With this, the raw material gas having flowed through the first desulfurizer 43 is supplied to the hydrogen generating unit 31 (reformer). Since the hydrogen generating unit 31 has not yet generated the hydrogen-containing gas, the on-off valve 55 remains closed. By closing the on-off valve 36 and the on-off valve 38 and opening the on-off valve 40, the raw material gas having discharged from the hydrogen generating unit 31 is supplied through the fuel gas supply passage 35, the bypass passage 39, the condenser 58, and the off fuel gas supply passage 34 to the combustor 33. The raw material gas as a fuel and the air from the combustion air supply unit 56 are ignited in the combustor 33. Thus, the heating starts. After that, when the hydrogen generating unit 31 is increased in temperature up to a temperature at which the steam can be generated from liquid water supplied to the hydrogen generating unit 31, the operation of the water supply unit 42 is started. The water is supplied to the hydrogen generating unit 31 and evaporates in the hydrogen generating unit 31. Thus, the reforming reaction between the steam and the raw material gas starts in the reformer.

In the hydrogen generator 300 of the present embodiment, a city gas (13A) containing methane as a major component is used as the raw material gas. The amount of water supplied is controlled such that a ratio of the number of supplied steam molecules to the number of carbon atoms contained in the raw material gas supplied to the reformer becomes about three (for example, a steam to carbon ratio (S/C) is about three). The reformer in the hydrogen generating unit 31 is heated, and the steam-reforming reaction proceeds. After that, when the temperature detected by the first temperature detector 59 reaches a temperature at which the hydrogen generating unit 31 can generate the hydrogen-containing gas having a stable hydrogen concentration, the on-off valve 36 and the on-off valve 38 open, and the on-off valve 40 closes. With this, the hydrogen-containing gas is supplied to the fuel cell 37, and the electric power generation starts. The flow rate of the raw material gas supplied to the hydrogen generating unit 31 is controlled by the raw material gas supply unit such that the temperature of the hydrogen generating unit 31 (reformer) during the electric power generating operation becomes about 650° C.

Next, the on-off valve 55 opens, and a part of the hydrogen-containing gas discharged from the hydrogen generating unit 31 is circulated through the third passage 53 to the second passage (in the present embodiment, the common passage of the first passage 46 and the second passage 47). After the circulation is started, the on-off valve 48 opens, and the on-off valve 44 and the on-off valve 45 close. With this, the utilization of the first desulfurizer 43 is stopped, and the hydrodesulfurization is started in the second desulfurizer 51. The second desulfurizer is provided in the vicinity of the hydrogen generating unit 31 so as to become 300 to 400° C. An electric heater may be further provided around the second desulfurizer to maintain the above temperature.

Next, in the present embodiment, the recycle of the hydrogen-containing gas is started after the start of the electric power generation of the fuel cell system 400. However, the recycle of the hydrogen-containing gas of the hydrogen generating unit 31 may be started at the same time as or before the start of the electric power generation. To be specific, the recycle of the hydrogen-containing gas of the hydrogen generating unit 31 may be started anytime as long as the hydrogen generating unit 31 is stably generating the high-concentration hydrogen-containing gas.

Next, a method for stopping the hydrogen generator 300 and fuel cell system 400 of Embodiment 5 and one example of the operation of the present invention will be explained.

The method for stopping the operations of the hydrogen generator 300 and the fuel cell system 400 will be schematically explained. By stopping the supply of the raw material gas and the supply of the water, the combustion in the combustor 33 stops, and the temperature of the reformer in the hydrogen generating unit 31 lowers. As the temperature of the reformer lowers, the internal pressure of the hydrogen generating unit 31 lowers. At this time, in order to block the communication between the hydrogen generating unit 31 and the outside air such that the air do not get into the hydrogen generating unit 31, the on-off valve 36, the on-off valve 40, the on-off valve 50, and the on-off valve 55 are closed. Thus, a closed space containing the reformer is formed.

Here, as described above, the on-off valve 50 and the second desulfurizer 51 are provided downstream of the raw material gas supply unit. Specifically, as shown in FIG. 9, the on-off valve 50 and the second desulfurizer 51 are provided in this order. Moreover, as described above, the third passage 53 is connected to a point located upstream of the raw material gas supply unit. After that, as described above, the on-off valve 50 is closed when the operation of the hydrogen generator 300 stops. In other words, the hydrogen generator of the present embodiment includes: the raw material gas supply unit disposed between the second desulfurizer 51 and the meeting point where the passage located upstream of the second desulfurizer 51 and the third passage 53 meet; and the on-off valve 50 disposed between the raw material gas supply unit and the second desulfurizer 51 to close when the hydrogen generator stops.

The internal pressure of the hydrogen generating unit 31 may decrease to become negative pressure although it depends on the timing of the formation of the closed space and the temperatures of respective devices. Here, the hydrogen generator 300 of the present embodiment is configured to execute a pressure compensating operation of supplying the raw material gas to the reformer to suppress excessive negative pressure.

Figure 10:
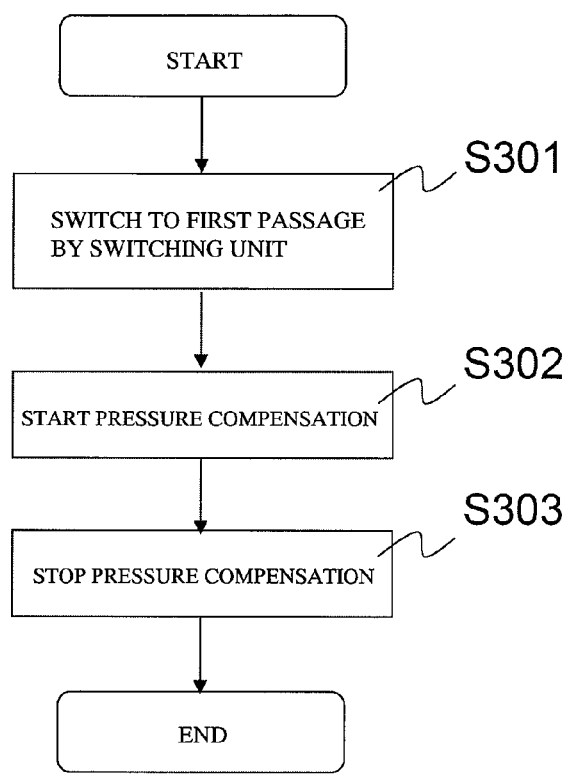
FIG. 10 is a diagram showing one example of an outline of operations executed in a pressure compensating operation in the hydrogen generator of Embodiment 5.

Next, an outline of operations executed in the pressure compensating operation in the hydrogen generator 300 of the present embodiment will be explained based on the flow chart shown in FIG. 10.

First, before the pressure compensating operation for the reformer starts, the controller 80 switches the flow passage of the raw material gas to the first passage 46 by the switching unit configured to switch the flow passage of the raw material gas between the first passage 46 and the second passage 47 (Step S301). Next, the pressure compensating operation is started (Step S302). After the raw material gas is supplied to the reformer for pressure compensation, the pressure compensating operation stops (Step S303). Here, the "switching unit" is constituted by the on-off valve 44, the on-off valve 45, and the on-off valve 48. However, the switching unit is not limited to this. The switching unit may be any unit as long as it can switch between the first passage and the second passage. For example, the switching unit may be constituted by one of the on-off valve 44 and the on-off valve 45 or may be constituted by a three-way valve disposed on the branching point where the first passage 46 branches from the second passage 47.

Figure 11:
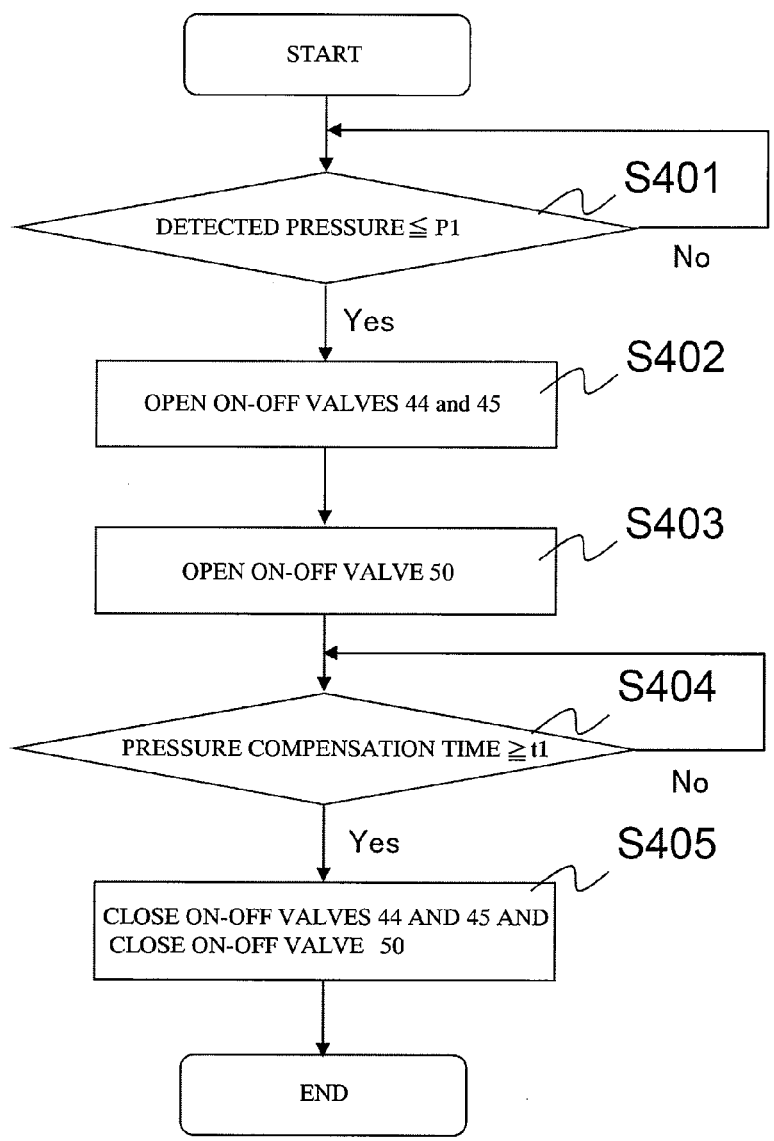
FIG. 11 is a diagram showing one example of details of the operations executed in the pressure compensating operation in the hydrogen generator of Embodiment 5.

Next, details of the pressure compensating operation will be explained based on the flow chart shown in FIG. 11. First, whether or not the pressure detected by a pressure detector (not shown) configured to detect the internal pressure of the reformer is equal to or lower than a predetermined pressure threshold P1 is determined (Step S401). When the detected pressure is equal to or lower than the predetermined pressure threshold P1, the on-off valve 44 and the on-off valve 45 open, and the flow passage of the raw material gas is switched to the first passage 46 (Step S402). After that, the on-off valve 50 opens. Thus, the raw material gas having predetermined supply pressure is supplied to the reformer for the pressure compensation (Step S403). Whether or not a raw material gas supply time (pressure compensation time) has reached a predetermined time threshold t1 is determined (Step S404). When the pressure compensation time is equal to or more than the predetermined time threshold t1 (Yes in Step S404), the controller 80 closes the on-off valve 44 and the on-off valve 45 and closes the on-off valve 50 to stop the pressure compensating operation (Step S405).

In the foregoing, the predetermined pressure threshold P1 is smaller than the value of the supply pressure of the raw material gas. Moreover, in the above pressure compensating operation, only the first passage 46 opens to supply the raw material gas to the reformer. However, the booster 41 may be activated to supply higher pressure to the reformer for the pressure compensation. In the above flow, the decrease in the internal pressure of the reformer is detected by the pressure detector. However, the present embodiment is not limited to the case of directly detecting the pressure in the reformer. The internal pressure of the reformer may be indirectly detected based on the temperature detected by the first temperature detector 59 or the elapsed time since the formation of the closed space including the reformer.

As described above, in the pressure compensating operation, by controlling the switching unit such that the passage through which the raw material gas flows is switched to the first passage 46, the pressure in the reformer is compensated by the raw material gas desulfurized by using the first desulfurizer 43. Therefore, the pressure compensation can be performed by the raw material gas without accelerating the deterioration of the reforming catalyst by the sulfur compound. Moreover, in the case of executing the pressure compensation by the raw material gas by using the second desulfurizer 51, there is a possibility that when the on-off valve 55 opens, the non-desulfurized raw material gas flows back through the third passage to the hydrogen generating unit 31 having the negative pressure. In the above pressure compensating operation, since the desulfurization is performed by using the first desulfurizer 43, the on-off valve 55 is in a closed state. Therefore, such possibility is reduced.

Moreover, when the hydrogen generator 300 of the present embodiment stops operating, it stops the supply of the raw material gas and the supply of the water and also stops the combustion of the combustor 33. After that, in order to block the communication between the hydrogen generating unit 31 and the outside air to prevent the air from getting into the hydrogen generating unit 31, the on-off valve 36, the on-off valve 40, the on-off valve 50, and the on-off valve 55 are closed to form the closed space including the reformer. After that, a raw material gas purging operation of purging the inside of the reformer using the raw material gas is executed to prevent the steam remaining in the reformer from condensing in accordance with the decrease in the temperature of the hydrogen generating unit 31.

Figure 12:
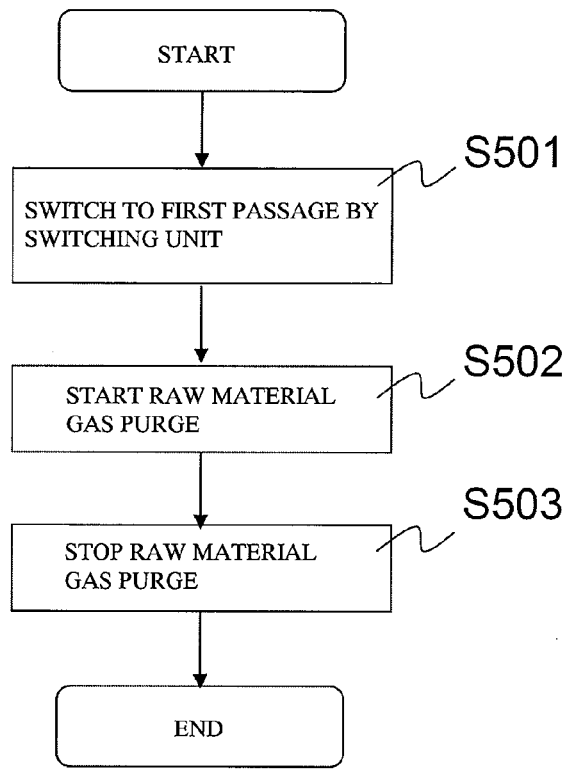
FIG. 12 is a diagram showing one example of an outline of operations executed in a raw material gas purging operation in the hydrogen generator of Embodiment 5.

Next, an outline of operations executed in the raw material gas purging operation in the hydrogen generator 300 of the present embodiment will be explained based on the flow chart shown in FIG. 12.

First, before the raw material gas purging operation for the reformer starts, the controller 80 switches the flow passage of the raw material gas to the first passage 46 by the switching unit configured to switch the flow passage of the raw material gas between the first passage 46 and the second passage 47 (Step S501). Next, the raw material gas purging operation is started (Step S502). After the inside of the reformer is purged using the raw material gas, the raw material gas purging operation stops (Step S503).

Figure 13:
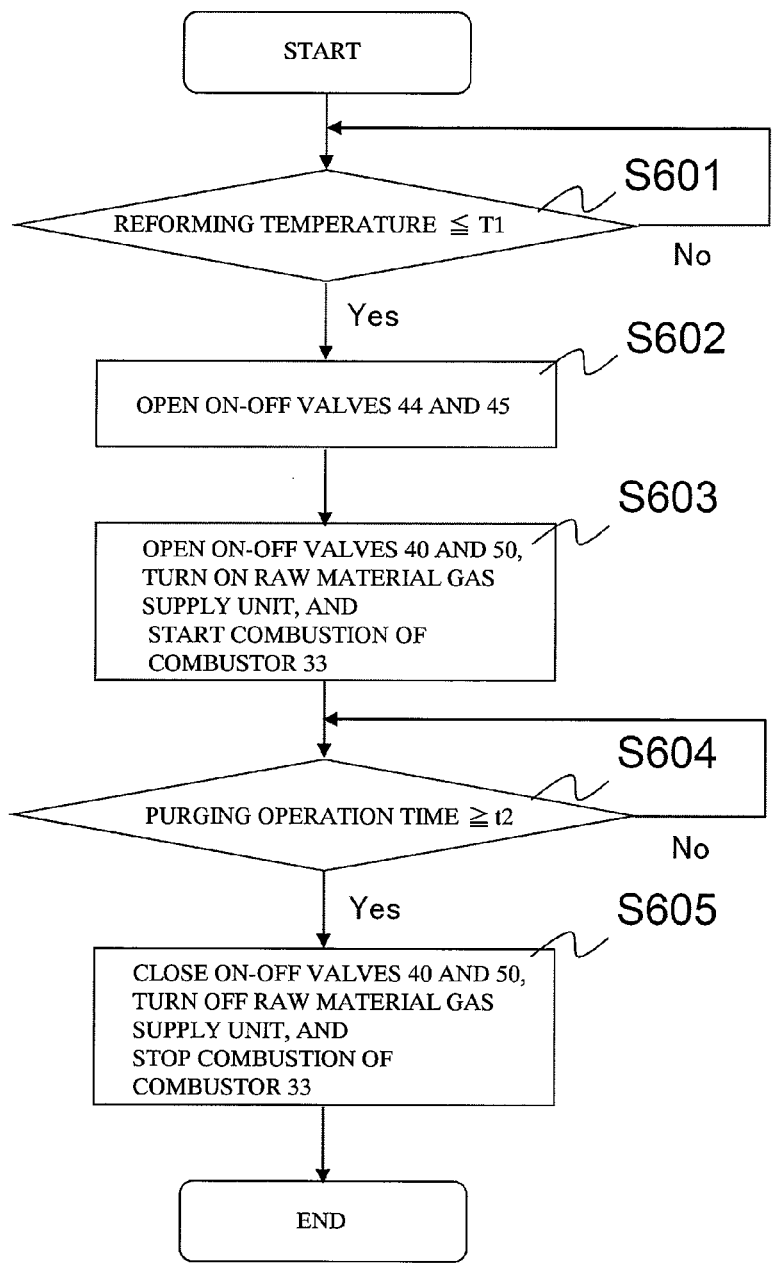
FIG. 13 is a diagram showing one example of details of the operations executed in the raw material gas purging operation in the hydrogen generator of Embodiment 5.

Next, details of the operations executed in the raw material gas purging operation will be explained based on the flow chart shown in FIG. 13. First, whether or not the temperature detected by the first temperature detector 59 configured to detect the temperature of the reformer is equal to or lower than a predetermined temperature threshold T1 is determined (Step S601). When the detected temperature is equal to or lower than the predetermined temperature threshold T1, the on-off valve 44 and the on-off valve 45 open, and the passage through which the raw material gas flows is switched to the first passage 46 (Step S602). After that, the on-off valve 40 and the on-off valve 50 open, and the operation of the raw material supply unit starts (herein, the operation of the booster 41 starts and the flow rate control valve 70 opens), and the operations of the combustion air supply unit 56 and the ignition unit start (Step S603). With this, the inside of the reformer is purged using the raw material gas, and the combustible gas containing the raw material gas discharged from the hydrogen generating unit 31 is combusted in the combustor 33. After that, whether or not the raw material gas supply time (purging operation time) has reached a predetermined time threshold t2 is determined (Step S604). When the purging operation time is equal to or more than the predetermined time threshold t2 (Yes in Step S604), the controller 80 closes the on-off valve 44 and the on-off valve 45 and closes the on-off valve 40 and the on-off valve 50 to stop the supply of the raw material gas to the reformer and the combustion operation of the combustor 33. After that, the residual gas in the combustor 33 is purged by the combustion air, the operation of the combustion air supply unit 56 then stops, and the raw material gas purging operation stops (Step S605). In the foregoing, the predetermined temperature threshold T1 is a temperature of the reformer and is defined as a temperature at which carbon deposition from the raw material gas do not occur. The predetermined time threshold t2 is defined as a time it takes to purge at least the inside of the reformer using the raw material gas.

As above, in the raw material gas purging operation, by controlling the switching unit such that the passage through which the raw material gas flows is switched to the first passage 46, the inside of the reformer is purged using the raw material gas desulfurized by the first desulfurizer 43. Therefore, the purging can be performed by the raw material gas without accelerating the deterioration of the reforming catalyst by the sulfur compound. Moreover, in the case of executing the raw material gas purging operation by using the second desulfurizer 51, there is a possibility that when the on-off valve 55 opens, the non-desulfurized raw material gas flows back through the third passage to the hydrogen generating unit 31 having the negative pressure. In the above raw material gas purging operation, since the desulfurization is performed by using the first desulfurizer 43, the on-off valve 55 is in a closed state. Therefore, such possibility is reduced.

The hydrogen generator 300 of the present embodiment explained as above is configured to execute both the pressure compensating operation and the raw material gas purging operation during the operation stop. However, the hydrogen generator 300 of the present embodiment may be configured to execute one of the pressure compensating operation and the raw material gas purging operation.

INDUSTRIAL APPLICABILITY

The hydrogen generator and fuel cell system of the present invention suppresses, more than before, the corrosion of the raw material gas supply unit disposed between the hydro-desulfurizer and the meeting point where the recycle channel and the raw material gas supply passage meet. Thus, the hydrogen generator and fuel cell system of the present invention are useful as a hydrogen generator used in a fuel cell system, a fuel cell system, and the like.

REFERENCE SIGNS LIST 1 hydrogen generating unit
3 combustor
5 first gas channel
6 raw material gas supply unit
7 hydro-desulfurizer
8 first on-off valve
10 recycle channel
11 fifth on-off valve
12 water supply unit
13, 13a, 13b, 13c sixth on-off valve
14 combustion gas channel
15 combustion air supply unit
16 flue gas channel
17 second gas channel
18a second on-off valve
18b second on-off valve
19 third on-off valve
20 controller
21 fourth on-off valve
22 third gas channel
23 fuel cell
24 fourth gas channel
25 fifth gas channel
26 normal temperature desulfurizer
31 hydrogen generating unit
33 combustor
34 off fuel gas supply passage
35 fuel gas supply passage
36 on-off valve
37 fuel cell
38 on-off valve
39 bypass passage
40 on-off valve
41 booster
42 water supply unit
43 first desulfurizer
44 on-off valve
45 on-off valve
46 first passage
47 second passage
48 on-off valve
49 water tank
50 on-off valve
51 second desulfurizer
53 third passage
54 condenser
55 on-off valve
56 combustion air supply unit
57 exhaust gas introducing passage
58 condenser
59 first temperature detector
70 flow rate control valve
80 controller
100 hydrogen generator
200 fuel cell system
300 hydrogen generator
400 fuel cell system

The invention claimed is:

1. A hydrogen generation apparatus comprising:
a hydrogen generator configured to generate a hydrogen-containing gas by using a raw material gas;
a hydro-desulfurizer configured to remove a sulfur compound in the raw material gas supplied to the hydrogen generator;
a first gas channel through which the raw material gas supplied through the hydro-desulfurizer to the hydrogen generator flows;
a recycle channel through which the hydrogen-containing gas from the hydrogen generator is supplied to the raw material gas flowing in the first gas channel, the recycle channel being connected to a meeting point of the first gas channel located upstream of the hydro-desulfurizer;
a raw material gas supply disposed between the hydro-desulfurizer and the meeting point;
a first on-off valve disposed on the first gas channel extending between the raw material gas supply and the hydro-desulfurizer;
a normal temperature desulfurizer configured to remove the sulfur compound in the raw material gas supplied to the hydrogen generator;
a second gas channel branching at a point located upstream of the hydro-desulfurizer, pass through the normal temperature desulfurizer, and meeting the first gas channel located upstream of the meeting point where the first gas channel and the recycle channel meet;
a second on-off valve disposed on the second gas channel; and
a third on-off valve disposed on the first gas channel extending between a branching point where the second gas channel branches from the first gas channel and a meeting point where the second gas channel meets the first gas channel.

2. The hydrogen generation apparatus according to claim 1, further comprising a controller configured to:
open the first on-off valve and the third on-off valve and close the second on-off valve when desulfurization is performed by using the hydro-desulfurizer; and
open the first on-off valve and the second on-off valve and close the third on-off valve when the desulfurization is performed by using the normal temperature desulfurizer.

3. The hydrogen generation apparatus according to claim 1, further comprising:
a third channel branching from the first gas channel extending between the raw material gas supply and the hydro-desulfurizer and meeting the first gas channel located downstream of the hydro-desulfurizer; and
a fourth on-off valve disposed on the third channel.

4. The hydrogen generation apparatus according to claim 3, further comprising a controller configured to:
open the first on-off valve and the third on-off valve and close the second on-off valve and the fourth on-off valve when desulfurization is performed by using the hydro-desulfurizer; and
open the second on-off valve and the fourth on-off valve and close the first on-off valve and the third on-off valve when the desulfurization is performed by using the normal temperature desulfurizer.

5. A hydrogen generation apparatus comprising;
a hydrogen generator configured to generate a hydrogen-containing gas by using a raw material gas;
a hydro-desulfurizer configured to remove a sulfur compound in the raw material gas supplied to the hydrogen generator;
a first gas channel through which the raw material gas supplied through the hydro-desulfurizer to the hydrogen generator flows;
a recycle channel through which the hydrogen-containing gas from the hydrogen generator is supplied to the raw material gas flowing in the first gas channel, the recycle channel being connected to a meeting point of the first gas channel located upstream of the hydro-desulfurizer;
a raw material gas supply disposed between the hydro-desulfurizer and the meeting point;
a first on-off valve disposed on the first gas channel extending between the raw material gas supply and the hydro-desulfurizer;
a normal temperature desulfurizer configured to remove the sulfur compound in the raw material gas supplied to the hydrogen generator;
a second gas channel branching from the first gas channel extending between the raw material gas supply and the first on-off valve, pass through the normal temperature desulfurizer, and meeting the first gas channel located downstream of the hydro-desulfurizer; and
a second on-off valve disposed on the second gas channel.

6. The hydrogen generation apparatus according to claim 5, further comprising a controller configured to:
open the first on-off valve and close the second on-off valve when desulfurization is performed by using the hydro-desulfurizer; and
open the second on-off valve and close the first on-off valve when the desulfurization is performed by using the normal temperature desulfurizer.

\* \* \* \* \*